US009969818B2

(12) United States Patent
Battistel et al.

(10) Patent No.: US 9,969,818 B2
(45) Date of Patent: May 15, 2018

(54) INTEGRATED PROCESS FOR PROCESSING AND UTILISING THE GUAYULE PLANT

(71) Applicant: Versalis S.p.A., San Donato Milanese (MI) (IT)

(72) Inventors: Ezio Battistel, Casalino (IT); Stefano Ramello, Novara (IT); Cecilia Querci, Novara (IT)

(73) Assignee: Versalis S.p.a., San Donato Milanese (IT)

( * ) Notice: Subject to any disclaimer, the term of this patent is extended or adjusted under 35 U.S.C. 154(b) by 0 days. days.

(21) Appl. No.: 15/515,299

(22) PCT Filed: Oct. 21, 2015

(86) PCT No.: PCT/EP2015/074334
§ 371 (c)(1),
(2) Date: Mar. 29, 2017

(87) PCT Pub. No.: WO2016/062753
PCT Pub. Date: Apr. 28, 2016

(65) Prior Publication Data
US 2017/0218094 A1 Aug. 3, 2017

(30) Foreign Application Priority Data
Oct. 22, 2014 (IT) .............................. MI2014A1822

(51) Int. Cl.
C08C 1/04 (2006.01)
C08C 2/02 (2006.01)
C08C 2/06 (2006.01)
C08C 1/00 (2006.01)
C08C 1/02 (2006.01)
C08C 2/00 (2006.01)
C08C 4/00 (2006.01)

(52) U.S. Cl.
CPC .................. C08C 2/06 (2013.01); C08C 1/00 (2013.01); C08C 1/02 (2013.01); C08C 1/04 (2013.01); C08C 2/02 (2013.01); C08C 2/00 (2013.01); C08C 4/00 (2013.01); Y02P 20/125 (2015.11)

(58) Field of Classification Search
USPC ........................................................ 528/930
See application file for complete search history.

(56) References Cited

U.S. PATENT DOCUMENTS

| 2,434,412 | A | 1/1948 | Jones et al. |
| 4,526,959 | A | 7/1985 | Kay |
| 4,804,741 | A | 2/1989 | Verbiscar |
| 7,259,231 | B2 | 8/2007 | Cornish et al. |
| 7,790,036 | B2 | 9/2010 | Cornish et al. |
| 7,923,039 | B2 | 4/2011 | Cornish et al. |
| 8,431,667 | B2 | 4/2013 | Cornish et al. |
| 2006/0106183 | A1 | 5/2006 | Cornish et al. |
| 2006/0149015 | A1 | 7/2006 | Cornish et al. |
| 2008/0015336 | A1 | 1/2008 | Cornish |
| 2008/0300526 | A1 | 12/2008 | Gumbs et al. |
| 2009/0009930 | A1 | 1/2009 | Furuzawa et al. |
| 2009/0054595 | A1 | 2/2009 | Cornish et al. |
| 2009/0099327 | A1 | 4/2009 | Cornish et al. |
| 2011/0021743 | A1 | 1/2011 | Cornish et al. |
| 2012/0063969 | A1 | 3/2012 | Cornish et al. |

FOREIGN PATENT DOCUMENTS

| DE | 10057910 | 6/2002 |
| EP | 1946715 | 7/2008 |
| EP | 1969036 | 9/2008 |
| EP | 2152511 | 2/2010 |
| EP | 2183303 | 5/2010 |
| EP | 2205661 | 7/2010 |
| JP | 2010529227 | 8/2010 |
| JP | 2010/536987 | 12/2010 |
| WO | 2007/046859 | 4/2007 |
| WO | 2007/081376 | 7/2007 |
| WO | 2008/147439 | 10/2007 |
| WO | 2008/147439 | 12/2008 |
| WO | 2009/025675 | 2/2009 |
| WO | 2009/051605 | 4/2009 |
| WO | 2009/051606 | 4/2009 |
| WO | 2009/078883 | 6/2009 |
| WO | 2012/063969 | 3/2012 |
| WO | 2013/134429 A1 | 9/2013 |
| WO | 2013/134430 | 9/2013 |
| WO | 2013/192182 A1 | 12/2013 |

(Continued)

OTHER PUBLICATIONS

International Search Report and Written Opinion for PCT/EP2015/074334 dated Oct. 21, 2015, 10 pages.
Scora et al. (Scora, R.W., Kumamoto, J., J. Agric. Food Chem., 1979, p. 27.
Swift, Karl A.D., Catalytic transformations of the major terpene feedstock, Topics in Catalysis, 2004, 27, pp. 1-4.
J. Marvah et al. (J. Marvah, Wood Chem. & Techn. 14, 1994, p. 563.
Salvucci M.E. et al., Industrial Crops and Products 30 (2009) pp. 9-16.
K. Cornish et al., Industrial Crops and Products 41 (2013), pp. 158-164.
Nakajama (Guayule future development; F.S. Nakayama, Industrial Crops and Products 22 (2005) pp. 3-13.
Nakayama (Nakayama, F.S. et al., Industrial Crops and Products 14 (2001), pp. 105-111).
Srinivasan et al. (Srinivasan, N., Bioresource Technology 101 (2010), pp. 9785-9791.

(Continued)

Primary Examiner — Terressa Boykin
(74) Attorney, Agent, or Firm — Abel Law Group, LLP

(57) ABSTRACT

The present invention relates to an integrated process for processing and utilizing every part of the guayule plant (*Parthenium argnetatum*) which comprises the following steps in sequence: separating the stem and branches from the leaves of said plant with a mechanical treatment; treating the leaves to produce waxes and essential oils, and a fraction containing cellulose, hemicellulose (carbohydrates) and, to a minor extent, salts, organic compounds and lignin; extracting from the stem and branches a liquid phase, so forming a first solid woody residue, indicated with bagasse in the present text; treating said first solid woody residue to prepare sugars, resin, rubber and lignin.

31 Claims, 7 Drawing Sheets

(56) References Cited

FOREIGN PATENT DOCUMENTS

WO      2013/192217      12/2013

OTHER PUBLICATIONS

Figure 1:
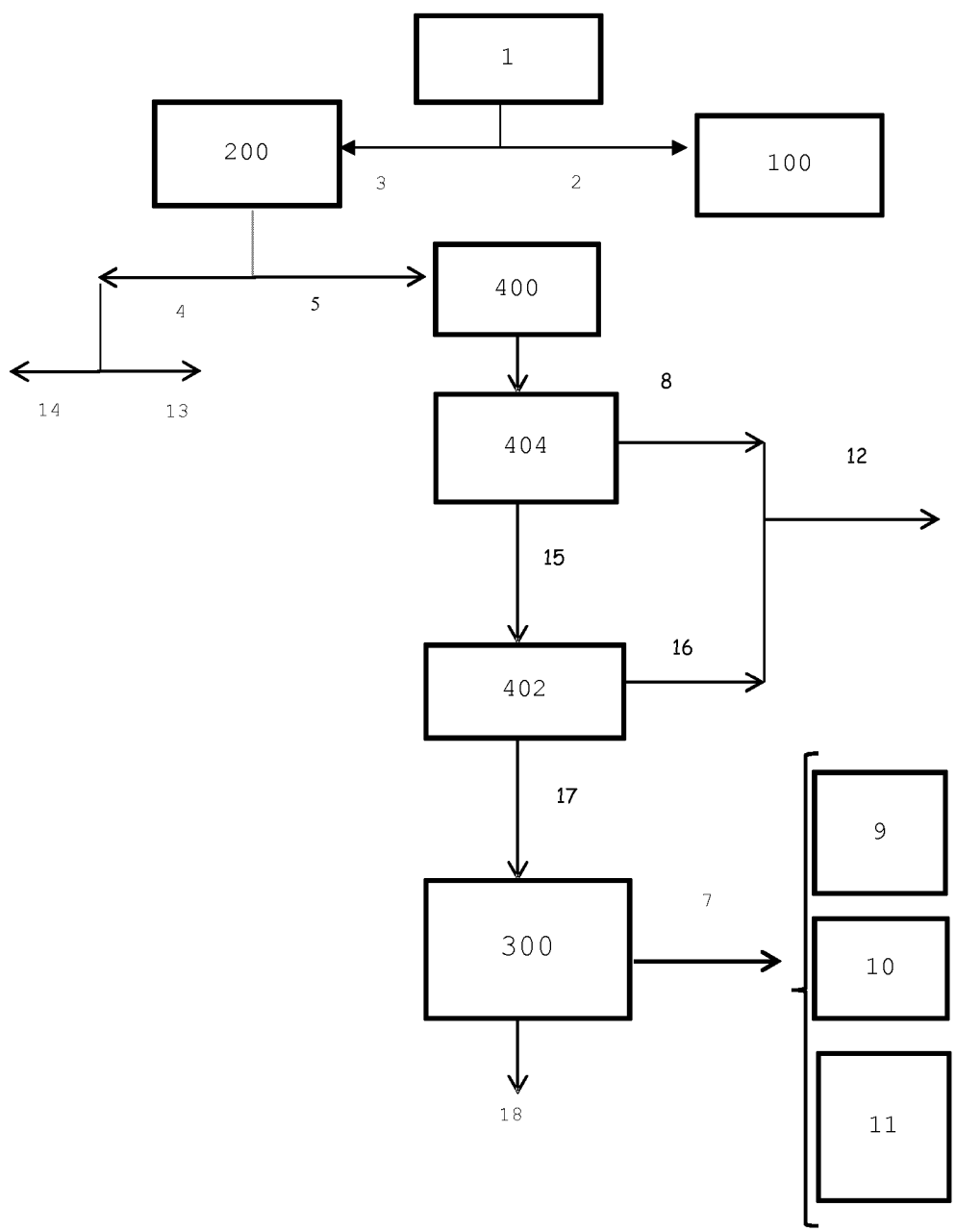

Srinivasan, N. et al., Biomass and Bioenergy 47, (2012), pp. 451-458.
Chundawat S.P.S. et al, Industrial Crops and Products 2012,37, pp. 486-492.
Barzegari M.R. et al., Polymer Composites, 2012,33, pp. 353-361.
Pucciariello R. et al. Polymer (2004), 45, pp. 4159-4169.
Azadi P., et al. Renewable and Sustainable Energy Reviews 2013, 21, pp. 506-523.
'Top Value-Added Chemicals from Biomass—Results of Screening for Potential Candidates from Biorefinery Lignin', vol. II, PNNL-16983, 2007.
Hernandez I.T. Tech. Pecuaria Mexico, 1976, 31.89.
Banigan, T.F., Verbiscar, A.J., Weber, C.W., 1982. (Composition of guayule leaves, seed, and wood. J. Agric. Food Chern. 30, pp. 427-481).
Bultman, J.D., Gilbertson, R.K., Adaskaveg, J., Amburgey, T.L., Parikh, S.V., Bailey, C.A., 1991, (The efficacy of guayule resin as a pesticide. Bioresour. Technol. 35, pp. 1997-2001).
Nakayama, F.S., Vinyard, S.H., Chow, P., Bajwa, D.S., Youngquist, J.A., Muehl, J.H., Krzysik, A.M., 2001 (Guayule as a wood preservative) Ind. Crops Prod. 14, pp. 105-111.
Maatooq G.T. and Hoffmann J.J. (Fungistatic sesquiterpenoids from Parthenium, Phytochemistry, 1996, 43, pp. 67-69.

INTEGRATED PROCESS FOR PROCESSING AND UTILISING THE GUAYULE PLANT

The present invention relates to an integrated process for processing and utilising every part of the guayule plant (*Parthenium argentatum*), including residual parts, for the purpose of producing not only natural rubber, but also compounds which may be used in the energy field and in the production of chemicals, such as for example bio-butadiene or butandiols and the production in a bio-refinery.

In the present patent application, all the operating conditions mentioned in the text should be taken to be preferred conditions even if this is not explicitly stated.

For the purposes of the present explanations, the term "comprise" or "include" also encompasses the term "consist in" or "essentially consist of".

For the purposes of the present explanations, unless stated otherwise, range definitions always include the extremes.

Guayule is a shrubby plant native to the semi-arid regions of south-western USA and northern Mexico. This plant accumulates natural rubber in the form of latex, most particularly in the bark (branches and stem). Furthermore, said plant moreover produces resins mainly composed of terpene compounds, most particularly distributed in the woody fraction. After extraction of the rubber and resin, the lignocellulosic fraction may be used as a source of fermentable sugars, while the leaves are used as a source of essential oils and waxes.

Rubber extraction efficiency is reduced if the leaves are present during the extraction process because they result in the formation of fine particulate matter during the successive comminution steps. This particulate matter tends to clog filtration systems, reduce the stability of the dilute rubber dispersions (latex) and, ultimately, increase the metal and ash content (up to 20%, unusable residue if the plant is burnt).

U.S. Pat. No. 2,434,412, which describes the process applied in the Saltillo pilot project (Coahuila in Mexico), shows that the rubber recovery rate is 10 points lower when plants are not defoliated.

US patent 2012/0063969 describes the use of mechanical or air/density separation machinery (separator system 14/16-18) which separates leaves, flowers and small branches, which make up approx. 30-35% of the plant. The leaf and flower fraction is sent to a subsequent processing area for further applications which are not specified in the patent application.

At present, the leaves are sent for combustion or spread as soil amendments.

The leaves contain a significant fraction of essential oils which may be quantitatively extracted.

The article by Scora et al. (Scora, R. W., Kumamoto, J., J. Agric. Food Chem., 1979, 27) describes that pinene and limonene are the most abundant components in the essential oil fraction and that said components are more abundant in *Parthenium argentatum* than in other species of the genus *Parthenium*.

Using the steam distillation method under a $CO_2$ atmosphere, the authors have obtained an oil containing from 60% to 80% of monoterpenes, the approximate composition of which is as follows: 17-24% α-pinene, 10-20% β-pinene, 6-9% sabinene, 6-9% limonene, 9-13% terpinolene and 6% bornyl acetate.

Pinene is an important base compound for chemical synthesis of compounds usable in the fragrance sector. Limonene alone is produced in a quantity of approx. 30000 tons/year (Swift, Karl A. D., Catalytic transformations of the major terpene feedstock, Topics in Catalysis, 2004, 27, 1-4).

At present, natural terpene resins are synthesised by polymerisation of α- and β-pinene, obtained by distilling turpentine oil (produced by steam distillation of pine/larch resin). Pinene may furthermore be used for synthesising synthetic adhesives. For example, patent applications WO 2008/147439, EP 2152511, US 2008/300526 and JP 2010529227 describe a (wet-skin) adhesive formed from guayule rubber and a tackifier based on guayule or polyterpene (poly α- or β-pinene) resin. The resin provides adhesive properties towards wet skin and in water, while the rubber component imparts cohesion to the adhesive.

The leaves are covered by a thin layer of wax which is a minority component of the dry weight of the leaves (approx. 1-3%). Guayule wax has properties similar to those of carnauba wax. The wax can be recovered using an organic solvent (for example hexane) and purified by subsequent extraction with an alcohol (for example methanol).

The article by J. Marvah et al. (J. Marvah, Wood Chem. & Techn. 14, 1994, 563) describes extracting the leaves with cyclohexane as solvent and subsequent purification by extraction with methanol, followed by crystallisation from $CHCl_3$, with a yield of approx. 2% relative to the dry leaves.

Natural guayule rubber is primarily present in the bark and in the woody tissue of the plant in the form of an aqueous suspension finely dispersed within the plant cells (latex). Extraction and preparation of the latex and rubber have been widely described in the literature. Patents US 2006/149015, U.S. Pat. No. 7,923,039, WO 2007/081376, WO 2007/081376, EP 1969036, EP 1969036 and US 2012/0063969 describe all the apparatus and stages in the process of harvesting, extracting, concentrating and characterising guayule latex. The possibility of using the bagasse in other processes such as resin extraction and the use of the lignin, cellulose and hemicellulose are also described. Finally all the materials obtainable from guayule other than the latex are also described, such as: resin, lignin, adhesives, pesticides, antifungal agents, ethanol, mowing for mulching, organic soil amendments, fuel, pellets, building material and insulating materials.

Documents U.S. Pat. No. 7,259,231, US 2006/106183, WO 2007/046859, US 2011/021743, US 2008/015336, EP 1948715, EP 1948715, EP 1948715 describe methods for extracting, separating, fractionating and purifying plant biopolymers (guayule resin and rubber) by supercritical solvent extraction (for example $SC-CO_2$ which proves to be a good solvent for the resin but not for the rubber), also using polar and/or nonpolar co-solvents to increase the selective extraction of resin or rubber. The patents listed above describe various applications which are set out below:

i) simultaneous extraction of the resin and rubber with $SC-CO_2$ and a nonpolar co-solvent (for example hexane, 1-hexene or cyclohexane) followed by fractionation with $SC-CO_2$;

ii) selective extraction of the resin with $SC-CO_2$ and polar co-solvent (for example $H_2O$, acetone or ethanol) and subsequent extraction of the rubber with nonpolar solvent.

These applications provide for an optional step of pre-treatment of the plant, such as for example defoliation; a separation step; a fractionation step and a purification step, but once the plant has been divided into its components (branches, leaves, resins and rubber) it is only resin extraction which is developed, the extraction process being described. Documents U.S. Pat. No. 7,790,036, US 2009/099327, WO 2009/051606, EP 2205661, EP 2205661 describe methods for rapidly extracting biopolymers, such as rubber, from plants, such as guayule, using a solvent denoted "expanded hexane". "Expanded hexane" is defined as a binary system of solvents in which the co-solvent $CO_2$ is used to expand the volume and reduce the density of the hexane. Although these methods are used for both resins and rubber, they leave the lignocellulosic bagasse intact, there being no indication of use thereof.

The latex is used for the preparation of manufactured articles by film coating (for example gloves) or components for specialised applications in the biomedical field (for example catheters, specialised prostheses, as described for example documents U.S. Pat. No. 8,431,667 and WO 2009/078883, which claim the preparation of articles based on a thin elastic film of a thickness of less than 0.04 mm), from natural rubber obtained from guayule latex. Documents EP 2183303, WO 2009/025675, US 2009/054595, JP 2010/536987 and EP 2183303 describe a process for making articles from guayule rubber with physical properties similar or superior to the rubber from *Hevea brasiliensis*.

Patent application WO 2007/081376 claims an extraction process for the rubber and resin by using a solvent (acetone) capable of quantitatively extracting the resin components. The document describes a method for extracting biopolymers, for example natural rubber, from plants other than *Hevea*, in particular from guayule.

Simultaneous extraction of the resin and rubber is widely described in the literature. Patent application WO 2013/134430 describes a process for simultaneously extracting the resin and rubber with a mixture of solvents, for example acetone/hexane. The extraction mixture is made up of: 10-50% plant matter, 50-90% mixture of the two solvents (hexane/acetone or cyclohexane/acetone in a quantity of 10-35%), 0.5-10% water from the plant. The polar solvents used in WO 2013/134430 are C1 to C8 alcohols, C2 to C8 ethers and esters, C4 to C8 cyclic ethers, C3 to C8 ketones and combinations thereof. Patent application WO 2013/192217 describes some biomass pre-treatments for maximising the material extracted from the plant (rubber and resin), while U.S. Pat. No. 7,790,036 describes using expanded hexane (i.e. mixed with an appropriate solvent) as an extraction solvent which proves to be more effective than supercritical $CO_2$ or $CO_2$ and hexane as co-solvent.

The conditions for extraction of the resin and rubber were studied in detail in two articles which are cited below:

Salvucci M. E. et al., Industrial Crops and Products 30 (2009) 9-16 and

K. Cornish et al., Industrial Crops and Products 41 (2013) 158-164).

The articles describe a method for the quantitative determination of the various resin and rubber fractions with the 'Accelerated Solvent Extraction' (ASE) method. A polar solvent, acetone or acetonitrile, is used to extract the resin, while a nonpolar solvent (cyclohexane) is used to extract the rubber.

All the cited literature describes methods for optimising the conditions for the storage, extraction and purification of the rubber and/or resin from the plant, irrespective of the conditions necessary for achieving complete utilisation of the residual lignocellulosic fraction which nevertheless constitutes 40-50% by weight of the bagasse.

After extraction and removal of the solvent, the resin may be used in many fields of applications (as reported in 9, 10 and 11 in FIG. 1). In this connection, Nakajama (Guayule future development; F. S. Nakayama, Industrial Crops and Products 22 (2005) 3-13) has exhaustively summarised many possible applications of guayule resin in the course of investigation and experimentation on a laboratory and pilot scale. Inter alia, the sesquiterpene component of the resins (including argentatine A and B) can replace synthetic compounds with a pesticidal or fungicidal action (as reported in 10 in FIG. 1). For example, it has proved possible, for combating parasitic nematodes, to use the resin instead of methyl bromide, a hazardous chemical substance which has been banned as an antiparasitic agent due to its toxicity. Argentatine A (one of the main components of guayule resin) has proved to be an acetylcholinase inhibitor with consequent antimicrobial properties.

The extracted resin fraction may be used in applications on wooden material where, as confirmed experimentally, it increases the resistance thereof to microbiological and atmospheric agents. Nakayama (Nakayama, F. S. et al., Industrial Crops and Products 14 (2001) 105-111) has found that guayule resin used for preserving articles manufactured from wood is as effective as conventional synthetic compounds (as reported in 9 in FIG. 1). In order to exploit the resin present in the wood of the plant, so avoiding the extraction step, the possibility is mentioned of using the woody material obtained directly from the plant, still containing the resin fraction, in composite materials with polyethylene or with other woody materials for the preparation of composite materials for uses requiring elevated resistance to termite attack and/or resistance to fungi or other microorganisms. Patent applications US 2009/0099309 and WO 2009/051605 describe a method for preparing a thermoplastic multipolymer of guayule resin by reacting the resin (which contains approximately 20% low molecular weight rubber, LMR), with an unsaturated monomer, for example selected from styrene, vinyl ether, isoprene, methacrylic, acrylic (acid, amide, ester), in an organic solvent such as for example toluene.

Copolymerisation increases the cohesive strength, transparency and thermal and oxidative stability of the resin, so making hotmelt application possible.

Documents WO 2008/147439, EP 2152511 and US 2008/300526 describe wet-skin adhesive materials formed from guayule rubber and a tackifier based on guayule resin or polyterpene (poly α- or β-pinene). The resin provides adhesive properties to wet skin and in water, while the rubber imparts cohesion to the adhesive.

The prior art describes the possibility of modifying the components of guayule resin through chemical reactions for the purpose of using it as a tackifier or as a component for composite materials. For example, patent application US 1985/4542191 describes treatment with formaldehyde, phenol-formaldehyde or urea-formaldehyde. The processes for obtaining said agents comprise the following steps: treatment with formaldehyde; treatment with phenol/formaldehyde; treatment with urea/formaldehyde; treatment with acids and treatment with sulphides, and combinations thereof.

Destructuring and saccharifying lignocellulosic guayule biomass has not been extensively studied, as is clear from an analysis of the prior art. It is known that guayule bagasse may be used as a source of sugars after appropriate destructuring treatment and subsequent hydrolysis reaction. For example, the article by Srinivasan et al. (Srinivasan, N., Bioresource Technology 101 (2010) 9785-9791) investigated the saccharification of guayule bagasse by explosion treatment with supercritical $CO_2$ at high pressure ($SC-CO_2$ explosion). After extraction of the latex and resin, the bagasse was subjected to explosion treatment at elevated temperature, up to 200° C., and elevated pressures, up to 4000 psi. The lignocellulosic residue was then treated with enzymes for the purpose of completing hydrolysis of the cellulose. The total yield for hydrolysis to monomeric sugars (C5 and C6) was 86% relative to the total initially available reducing sugars. However, the same authors, in a subsequent study, report the results of optimising the treatment conditions and parameters (Srinivasan, N. et al., Biomass and Bioenergy 47, (2012), 451-458) using the same technique ($SC$—$CO_2$ explosion) and conclude that under the best conditions a total yield for hydrolysis to monomers of 57% of the initial sugars is obtained.

The saccharification method described in these articles entails the use of elevated temperatures and pressures and is thus not advantageous. Furthermore, the total hydrolysis yield, after optimisation, does not exceed 57% under process conditions of elevated temperature and pressure.

It is also known that Chundawat (Chundawat S. P. S. et al. Industrial Crops and Products 2012, 37, 486-492) has observed that the saccharification of guayule bagasse may be carried out using AFEX (ammonium fibre explosion) technology as the biomass pre-treatment technology. Various forms of bagasse, both unprocessed and that obtained after extraction of the resin, were investigated. The best results were obtained with the bagasse from which the resin had been removed which gave an overall yield for hydrolysis to monomeric C5 and C6 sugars of 44% relative to the initial available sugars. The resultant sugars in any event proved to be fermentable by yeasts to yield ethanol. This pre-treatment technology uses ammonia at high pressure, which must be recycled to make the process sustainable. It furthermore involves saccharification of the bagasse with yields of no greater than 44%. It is furthermore noted in the article that hydrolysis of the cellulose from the bagasse obtained after having extracted rubber (with basic water) and resin (with polar solvent) in sequence is less efficient than with cellulose from the whole plant which has not been treated in any way.

If it is sufficiently purified, the lignin may be used as a source of chemical compounds after appropriate depolymerisation and/or derivatisation reactions. Alternatively, it has been used as a versatile filler component in polymeric materials such as, for example, plastics and rubbers for enhancing the mechanical and physicochemical properties thereof. For example, it may be used in epoxy resin and phenol/formaldehyde resin formulations.

In the case of tyre rubbers, lignin acts as a reinforcing component instead of carbon black: in comparison with the latter it is less dense, non-conductive, lighter in colour and is capable of replacing carbon black, often improving the mechanical and physicochemical properties of the formulation.

Patent DE10057910-A1 describes the preparation of a lignin which is derivatised (chemically modified) with nucleophilic compounds to yield esters, ethers or hemiacetals. Such lignin may be used as an additive or as a filler in the preparation of polymeric products, for example polystyrene, to increase the biodegradability thereof.

Barzegari et al. describe using lignin as a filler in polystyrene and ethylene/styrene/butylene copolymers (Barzegari M. R. et al., Polymer Composites, 2012, 33, 353-361). The rheological and mechanical properties of blends containing increasing quantities (up to 80%) of lignin were investigated. It was observed that the modulus of elasticity increases as a function of the quantity of lignin present in the composite material. Pucciariello et al. describe the physical properties of some blends of lignin with synthetic polymers (Pucciariello R. et al. Polymer (2004), 45, 4159-4169). The lignin, originating from cereal straw pretreated by steam explosion, was blended with polyethylene of various densities and polystyrene. It proved possible to process the blends using the conventional techniques used for thermoplastic polymers. The modulus of elasticity increases slightly in the blends containing lignin, while stress and elongation resistance decrease. Lignin furthermore acts as a stabiliser with regard to the deterioration caused by UV radiation.

The possibility of using lignin as a source of organic compounds, biofuels and hydrogen has been analysed by Azadi et al. (Azadi P., et al. Renewable and Sustainable Energy Reviews 2013, 21, 506-523). Various techniques may be used on an industrial scale to depolymerise lignin to yield organic compounds (aromatics, including phenol) or to convert it into synthesis gas which may be used to produce liquid fuels or intermediates and organic compounds (BTX, biomass-to-). For example, the applications of lignin (unsulfonated, like that described in the present invention) may be in fields such as bitumens, cement additives, activated carbons, carbon fibres, phenolic resins and in the food sector, such as the production of synthetic vanillin.

These types of applications in various industrial fields are listed in the documents 'Top Value-Added Chemicals from Biomass—Results of Screening for Potential Candidates from Biorefinery Lignin', Vol. II, PNNL-16983, 2007 and include the use of lignin as carbon fibres, as an additive for polymers and plastics, as a component in the synthesis of resins, adhesive materials and binders.

There is thus a need to develop an integrated process for the exploitation of all the components of the guayule plant. The prior art, on the other hand, only describes the separation and use of the individual components of the guayule plant using methods which are often independent of one another.

The Applicant has thus devised an integrated process which makes it possible to exploit every single part of the guayule plant.

In particular, the Applicant has found that the solid residue which is obtained after the extraction processes for the waxes and essential oils may advantageously be exploited to obtain resins, lignin and fermentable sugars.

The fermentable sugars may be obtained from hemicellulose and cellulose and may subsequently be used for the production of chemicals, such as bio-butadiene or butandiols, microbial oils and biofuels (by way of lipids or triglycerides).

This is because the cellulose and hemicellulose may be made more readily accessible by applying appropriate biomass destructuring techniques which, for example, cause the destruction of the interaction between cellulose and lignin. In this manner, hemicellulose and cellulose may be degraded more readily using appropriate hydrolysis techniques to yield simple sugars (saccharification) to be used as a nourishing source for fermentative microorganisms.

Although some examples of destructuring and saccharification of the biomass obtained from the guayule plant are present in the literature, the utilisation of this residual fraction has not yet been studied in detail.

A first object of the present invention is thus to provide an integrated process which converts and utilises every single part of the biomass derivable from the guayule plant and which produces a variety of products which may be exploited both for their energy value and as chemicals, such as bio-butadiene, for example, in a bio-refinery.

A further object of the present invention is to provide an integrated process in which the steps of destructuring and saccharification make it possible to produce fermentable sugars more efficiently in both quantity and quality terms, in other words with a lower content of impurities in comparison with other techniques already known and used in the prior art.

To this end, the Applicant has devised an integrated process for processing and utilising every part of the guayule plant (*Parthenium argentatum*) which comprises the following steps in sequence:

separating the stem and branches (3) from the leaves (2) of said plant with a mechanical treatment (1)

treating the leaves (100) to produce waxes and essential oils (102), and a fraction (101) containing cellulose, hemicellulose (carbohydrates) and, to a minor extent, salts, organic compounds and lignin;

extracting (200) from the stem and branches a liquid phase (4), so forming a first solid woody residue (5), denoted bagasse in the present text;

treating said first solid woody residue (5) to prepare sugars, resin, rubber and lignin.

The integrated process provided by the present patent application has the advantage of efficiently and conveniently exploiting the whole guayule plant, which is usually only used selectively for producing natural rubber or resin.

Using all the components of guayule makes it possible also to produce, in addition to natural rubber, compounds which are usable in various sectors, including the sector of energy, food, pharmaceutical or timber industries (as reported in 9, 10 and 11 in FIG. 1), and more generally, in the production of chemicals. These include, for example, monomers usable for synthesising polymers and synthetic rubbers, such as butadiene. The integrated process provided by the present invention permits utilisation of all the fractions obtainable from the guayule plant, including any residual fractions, with particular reference to the production of fermentable sugars obtained from the lignocellulosic fraction.

Further purposes and advantages of the present invention will be more apparent from the following description and the appended figures, which are provided purely by way of non-limiting example.

FIG. 1 describes a preferred embodiment of the integrated process according to the present invention in which saccharification is carried out before the resin extraction step.

Figure 2:
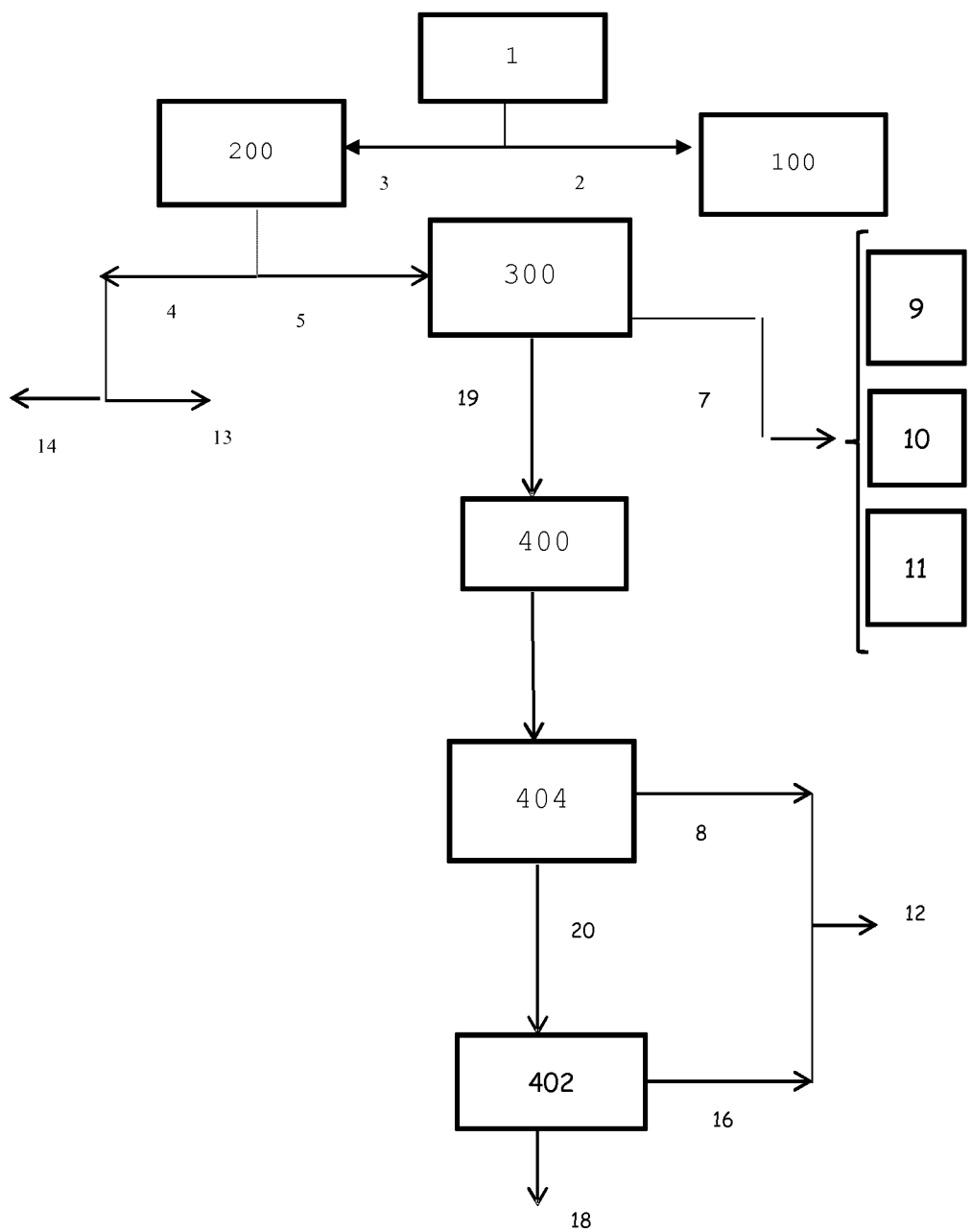

FIG. 2 describes a preferred embodiment of the integrated process according to the present invention in which the resin extraction step is carried out before saccharification.

Figure 3:
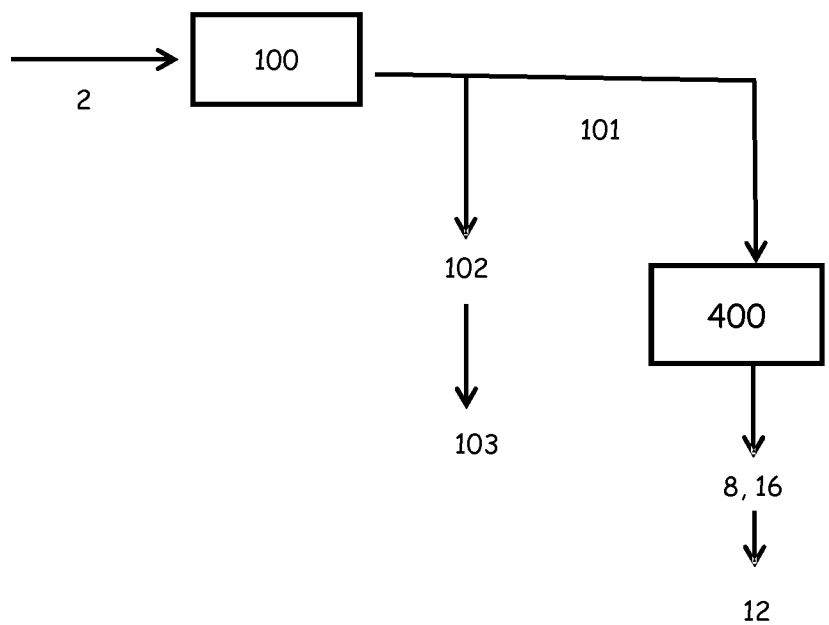

FIG. 3 describes a preferred embodiment of the treatment of the leaves of the guayule plant according to the present invention.

Figure 4:
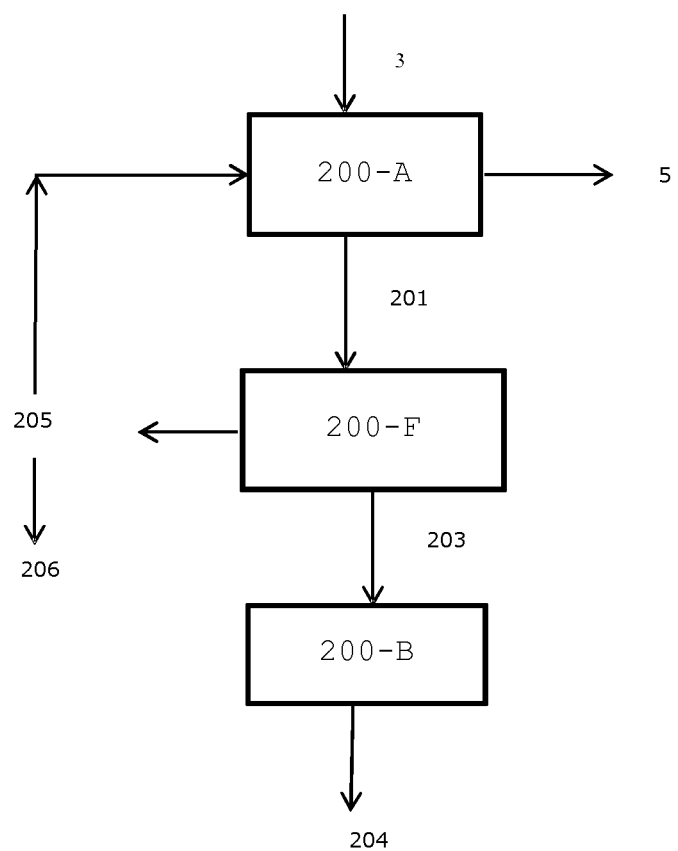

FIG. 4 describes a preferred embodiment of the treatment of the stem and branches of the guayule plant, for extracting latex, according to the present invention.

Figure 5:
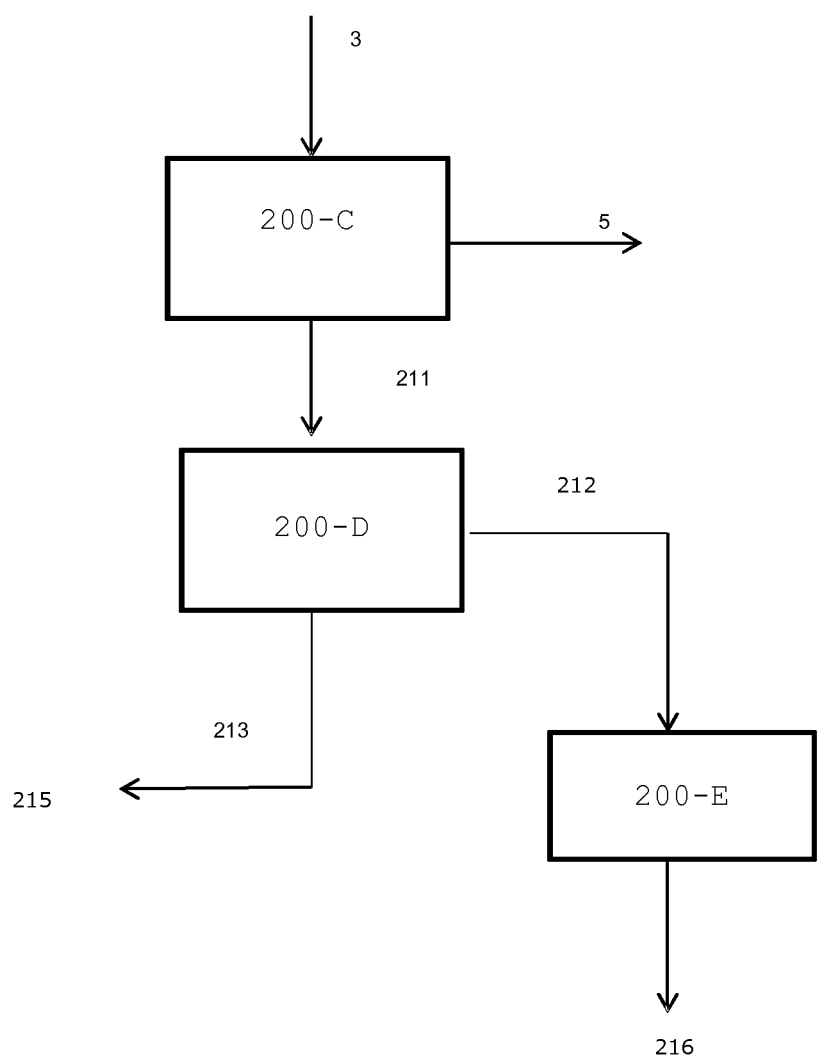

FIG. 5 describes a preferred embodiment of the treatment of the stem and branches of the guayule plant, for extracting rubber, according to the present invention.

Figure 6:
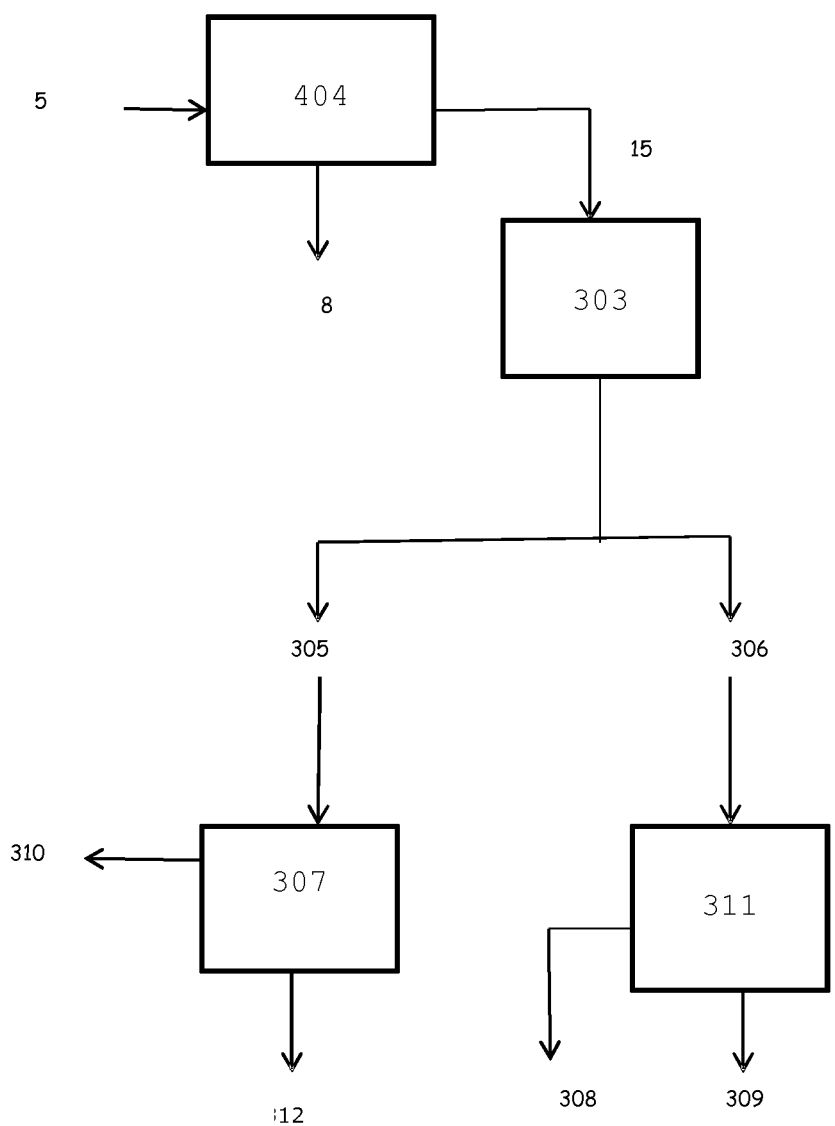

FIG. 6 describes a preferred embodiment of the extraction of resin from the first solid woody residue.

Figure 7:
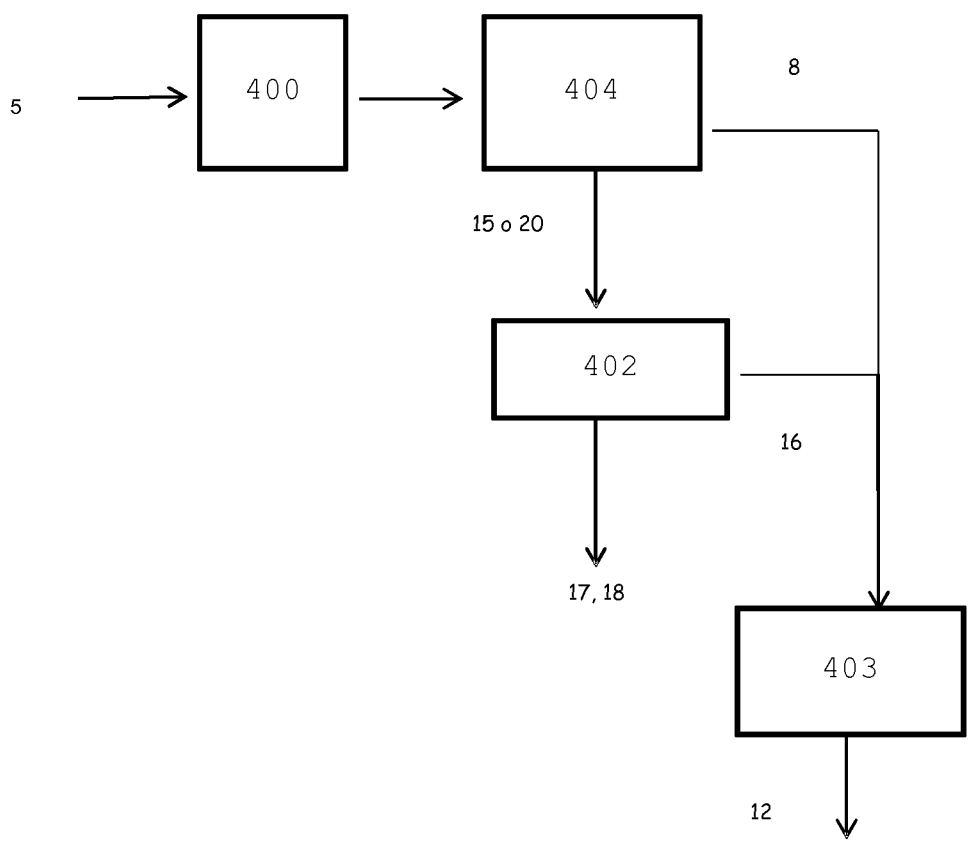

FIG. 7 describes a preferred embodiment of the saccharification step.

The figures will be described in detail below.

DETAILED DESCRIPTION

With reference to FIGS. 1-7, the present invention accordingly provides an integrated process for processing and utilising every part of the guayule plant (*Parthenium argentatum*) which comprises the following steps in sequence:

separating the stem and branches (3) from the leaves (2) of said plant with a mechanical treatment (1);

treating the leaves (100) to produce waxes and essential oils (102), and a fraction (101) containing cellulose, hemicellulose (carbohydrates) and, to a minor extent, salts, organic compounds and lignin;

extracting (200) from the stem and branches a liquid phase (4), so forming a first solid woody residue (5), denoted bagasse in the present text;

treating said first solid woody residue (5) to prepare sugars, resin, rubber and lignin.

In a preferred embodiment according to the present invention, the treatment of the stem and branches (3) is an extraction with basic water which forms an aqueous emulsion (4) and a first solid woody residue (5) containing lignin, cellulose, hemicellulose, resin and residual rubber. Concentrated latex (203 or 13 in FIGS. 1 and 2) is extracted from said aqueous emulsion. Natural rubber (204 or 14 in FIGS. 1 and 2) may be obtained from the concentrated latex (203 or 13 in FIGS. 1 and 2) with a further coagulation step.

In a preferred embodiment according to the present invention, the stem and branches (3) are, in contrast, treated by extraction with a nonpolar organic solvent, preferably selected from linear, branched and cyclic alkanes having from 5 to 12 carbon atoms, denoted C5-C12 alkanes, preferably having from 6 to 8 carbon atoms, denoted C6-C8 alkanes, more preferably 5, 6, 7 and 8 carbon atoms, more preferred alkanes are those selected from n-pentane, n-hexane, n-heptane, n-octane and cyclohexane and mixtures thereof, forming an organic solution (211) and a first solid woody residue (5) containing hemicellulose, cellulose and lignin. Natural rubber (212 or 14 in FIGS. 1 and 2) is extracted from said organic solution, preferably by precipitation with a polar solvent, such as for example acetone, ethyl acetate or mixtures thereof, which rubber may subsequently also be redispersed in water to form latex (216 or 13 in FIGS. 1 and 2).

In a preferred embodiment, the process described and claimed in the present patent application comprises the following steps in sequence:

separating the stem and branches (3) from the leaves (2) of said plant with a mechanical treatment (1)

treating the leaves (100) to produce waxes and essential oils (102), and a solid fraction (101) containing cellulose, hemicellulose (carbohydrates) and, to a minor extent, salts, organic compounds and lignin;

extracting (200) from the stem and branches a liquid phase (4) and so forming a first solid woody residue (5), indicated with bagasse in the present text;

extracting resin and rubber (300) from said first solid woody residue (5) and so forming a fifth solid woody residue (19) containing lignin, hemicellulose and cellulose;

hydrolysing (400) said fifth solid residue (19) to form sugars having 5 carbon atoms (8) and a sixth solid woody residue (20) containing lignin and cellulose;

hydrolysing said sixth solid residue (20) to convert the cellulose into sugars having 6 carbon atoms, denoted C6 in the present text, and so forming a final solid residue (18) containing lignin and an amount of residual cellulose of less than 20%.

For the purposes of the present description and the appended claims, the phrase "sugars having 5 carbon atoms" is taken to mean a pentose sugar, or more simply a pentose, which is a monosaccharide carbohydrate composed of five carbon atoms having the formula chemical $C_5H_{10}O_5$. For the purposes of the present description and the appended claims, the phrase "sugars having 6 carbon atoms" is taken to mean a hexose sugar, or more simply a hexose, which is a monosaccharide carbohydrate composed of six carbon atoms having the formula chemical $O_6H_{12}O_6$.

With reference to FIG. 2, the first solid woody residue (5) is treated by extraction with organic nonpolar solvent (300) preferably selected from linear, branched and cyclic alkanes having from 5 to 12 carbon atoms, denoted C5-C12 alkanes, preferably having from 6 to 8 carbon atoms, denoted C6-C8 alkanes, more preferably 5, 6, 7 and 8 carbon atoms, more preferred alkanes are those selected from n-pentane, n-hexane, n-heptane, n-octane and cyclohexane and mixtures thereof, to separate resin and rubber (7), so forming a fifth solid woody residue (19) containing lignin, hemicellulose and cellulose.

Said fifth solid residue (19) is subsequently subjected to saccharification (400) in two stages. In the first stage, an acid hydrolysis (404) is carried out to convert the hemicellulose into sugars having 5 carbon atoms, denoted C5 in the present text, and so forming a sixth solid woody residue (20) containing lignin and cellulose.

Acid hydrolysis is carried out with a phosphonic acid, an organic acid of the general formula: R—PO(OH)$_2$ (I), in which R is a linear or branched alkyl group, or an aromatic group, or a group containing a heteroatom.

The alkyl group may preferably contain from 1 to 6 carbon atoms, more preferably from 1 to 3 carbon atoms.

The alkyl group is preferably selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

The aromatic group is preferably selected from compounds of the formula: R'—C$_6$H$_5$ or R'—C$_{10}$H$_8$ where R' is a linear or branched alkyl having from 1 to 3 carbon atoms, preferably R' is a methyl.

The group containing a heteroatom is preferably selected from those containing oxygen (O), preferably the —OH group or a carbonyl group; or containing nitrogen (N), preferably the —NH$_2$ group or the N-substituted —NH$_2$ group; or containing phosphorus (P), preferably the —CH$_3$OH—PO(OH)$_2$ (diphosphonate) group.

More preferred are the alkylphosphonic acids of the general formula R—PO(OH)$_2$ (I), in which R is a linear or branched alkyl group which may contain from 1 to 6 carbon atoms, preferably from 1 to 3 carbon atoms; more preferably R is selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

More preferred are the phosphonic acids of the general formula R—PO(OH)$_2$ (I), in which R is a group containing a heteroatom selected from those containing oxygen (O), preferably the —OH group or a carbonyl group; or containing nitrogen (N), preferably the —NH$_2$ group or the N-substituted —NH$_2$ group; or containing phosphorus (P), preferably the CH$_2$—PO(OH)$_2$ (diphosphonate) group.

Among the phosphonic acids, those which are preferred are those of the general formula R—PO(OH)$_2$ (I), in which R is the —CH$_3$OH—PO(OH)$_2$ (diphosphonate) group or etidronic acid (known as 1-hydroxyethane-1,1-diphosphonic acid), or in which R is the methyl group or methanephosphoric acid (methylphosphonic acid).

Preferably, the pH during acid hydrolysis is between 0.6 and 1.6, preferably between 0.8 and 1.3, more preferably between 0.9 and 1.

Acid hydrolysis is preferably carried out in a temperature range which extends from 120° C. to 160° C., more preferably from 130° C. to 150° C., still more preferably at 140° C.

Subsequently said sixth solid residue (20) is subjected to further hydrolysis selected from enzymatic, chemical or thermochemical hydrolysis (402) to convert the cellulose into sugars having 6 carbon atoms, denoted C6 in the present text, and so forming a solid residue (18) containing lignin and an amount of residual cellulose of less than 20%.

In a preferred embodiment, the process described and claimed in the present patent application comprises the following steps in sequence:
  separating the stem and branches (3) from the leaves (2) of said plant with a mechanical treatment (1);
  treating the leaves (100) to produce waxes and essential oils (102), and a solid fraction (101) containing cellulose, hemicellulose (carbohydrates) and, to a minor extent, salts, organic compounds and lignin;
  extracting (200) from the stem and branches a liquid phase (4) and so forming a first solid woody residue (5), denoted bagasse in the present text;
  treating the first solid woody residue (5) to form sugars having 5 carbon atoms (8) so forming a second solid residue (15),
  treating said second solid residue (15) to form sugars having 6 carbon atoms (16) and a third solid residue (17) (400),
  extracting resin and rubber (7) (300) from said third solid residue (17), forming a fourth woody residue (18) mainly composed of lignin.

According to said preferred embodiment, see FIG. 1, the first solid woody residue (5) is treated by a two-stage saccharification method.

In the first stage, acid hydrolysis (404) is carried out to convert the hemicellulose into sugars having 5 carbon atoms, C5, forming a second solid residue (15) containing lignin, cellulose, rubber and resins.

Acid hydrolysis is carried out with a phosphonic acid, an organic acid of the general formula: R—PO(OH)$_2$ (I), in which R is a linear or branched alkyl group, or an aromatic group, or a group containing a heteroatom.

The alkyl group may preferably contain from 1 to 6 carbon atoms, more preferably from 1 to 3 carbon atoms.

The alkyl group is preferably selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

The aromatic group is preferably selected from compounds of the formula: R'—C$_6$H$_5$ or R'—C$_{10}$H$_8$ where R' is a linear or branched alkyl having from 1 to 3 carbon atoms, preferably R' is a methyl.

The group containing a heteroatom is preferably selected from those containing oxygen (O), preferably the —OH group or a carbonyl group; or containing nitrogen (N), preferably the —NH$_2$ group or the N-substituted —NH$_2$ group; or containing phosphorus (P), preferably the —CH$_3$OH—PO(OH)$_2$ (diphosphonate) group.

More preferred are the alkylphosphonic acids of the general formula R—PO(OH)$_2$ (I), in which R is a linear or branched alkyl group which may contain from 1 to 6 carbon atoms, preferably from 1 to 3 carbon atoms; more preferably R is selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

More preferred are the phosphonic acids of the general formula R—PO(OH)$_2$ (I), in which R is a group containing a heteroatom selected from those containing oxygen (O), preferably the —OH group or a carbonyl group; or containing nitrogen (N), preferably the —NH$_2$ group or the N-substituted —NH$_2$ group; or containing phosphorus (P), preferably the CH$_2$—PO(OH)$_2$ (diphosphonate) group.

Among the phosphonic acids, those which are preferred are those of the general formula R—PO(OH)$_2$ (I), in which R is the —CH$_3$OH—PO(OH)$_2$ (diphosphonate) group or etidronic acid (known as 1-hydroxyethane-1,1-diphosphonic acid), or in which R is the methyl group or methanephosphoric acid (methylphosphonic acid).

Preferably, the pH during acid hydrolysis is between 0.6 and 1.6, preferably between 0.8 and 1.3, more preferably between 0.9 and 1.

Acid hydrolysis is preferably carried out in a temperature range which extends from 120° C. to 160° C., more preferably from 130° C. to 150° C., still more preferably at 140° C. Subsequently said second solid residue (15) is treated preferably by hydrolysis selected from enzymatic, chemical or thermochemical hydrolysis (402) to convert the cellulose into sugars having 6 carbon atoms, C6, and so forming a third solid residue (17) comprising lignin, resin, residual rubber, and an amount of residual cellulose of less than 20%.

The third solid residue (17) is then subjected to extraction with an organic solvent (300) selected from acetone, alcohols, ethyl acetates and mixtures thereof to separate resin and residual rubber (7) from a fourth solid residue (18) containing lignin and an amount of cellulose of less than 20%.

This particular and preferred sequence of operations, saccharification (400) preceding extraction of the resin (300), offers the advantage of extracting the resin with a single extraction step using organic solvent. Using the reverse sequence, i.e. firstly performing resin extraction (300) and subsequently saccharification (400), two successive extractions with organic solvent are necessary if the resin is to be recovered quantitatively.

Recovering the C5 and C6 sugars prior to extraction of the resin results in a higher conversion and yield of fermentable monomeric sugars than would be obtained with the reverse sequence. Table 1 shows yields and conversion results in relation to some examples.

The polysaccharide, hemicellulose and cellulose components may be hydrolysed to form their simple monomeric components, such as for example glucose (C6) obtained from cellulose, and a mixture of C5 sugars, in a proportion of up to 80%, such as for example xylose and arabinose, obtained from the hemicellulose.

The monomeric sugars obtained in this manner may advantageously be used as a carbon source in fermentation processes for producing alcohols, such as for example ethanol and butanol, diols, such as for example 1,3-propanediol, 1,3-butanediol, 1,4-butanediol or 2,3-butanediol, and other chemicals obtainable by fermentation.

After an appropriate dehydration reaction, the diols may be used to produce butadiene which is usable as a monomer for the synthesis of bio-polybutadiene. Or such sugars may be used for the fermentative synthesis of lipids, triglycerides with a high unsaturated acid content (for example oleic acid) or other intermediates and products.

Said alcohols, diols, lipids or other intermediates or products, may advantageously be used in the chemical industry or in formulating automotive fuels.

After acid hydrolysis, the bagasse contains guayuline A and B hydrolysed to form partheniol and hydroxybenzoic and cinnamic acid. The partheniol may then be recovered by selective precipitation with alcohols, for example methanol, without resorting to further hydrolysis of the guayulines. Partheniol is a compound which is active against termites and is an important base compound for the synthesis of perfumery products or products for controlling insect pests.

With reference to FIG. 6, in a preferred embodiment of the present invention the first solid woody residue (5) is pretreated by acid hydrolysis (404) to convert the hemicellulose into C5 sugars (8), forming a second solid residue (15) containing cellulose, resin, residual rubber and lignin.

Acid hydrolysis is carried out with a phosphonic acid, an organic acid of the general formula: R—PO(OH)$_2$ (I), in which R is a linear or branched alkyl group, or an aromatic group, or a group containing a heteroatom.

The alkyl group may preferably contain from 1 to 6 carbon atoms, more preferably from 1 to 3 carbon atoms.

The alkyl group is preferably selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

The aromatic group is preferably selected from compounds of the formula: R'—C$_6$H$_5$ or R'—C$_{10}$H$_8$ where R' is a linear or branched alkyl having from 1 to 3 carbon atoms, preferably R' is a methyl.

The group containing a heteroatom is preferably selected from those containing oxygen (O), preferably the —OH group or a carbonyl group; or containing nitrogen (N), preferably the —NH$_2$ group or the N-substituted —NH$_2$ group; or containing phosphorus (P), preferably the —CH$_3$OH—PO(OH)$_2$ (diphosphonate) group.

More preferred are the alkylphosphonic acids of the general formula R—PO(OH)$_2$ (I), in which R is a linear or branched alkyl group which may contain from 1 to 6 carbon atoms, preferably from 1 to 3 carbon atoms; more preferably R is selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

More preferred are the phosphonic acids of the general formula R—PO(OH)$_2$ (I), in which R is a group containing a heteroatom selected from those containing oxygen (O), preferably the —OH group or a carbonyl group; or containing nitrogen (N), preferably the —NH$_2$ group or the N-substituted —NH$_2$ group; or containing phosphorus (P), preferably the CH$_2$—PO(OH)$_2$ (diphosphonate) group.

Among the phosphonic acids, those which are preferred are those of the general formula R—PO(OH)$_2$ (I), in which R is the —CH$_3$OH—PO(OH)$_2$ (diphosphonate) group or etidronic acid (known as 1-hydroxyethane-1,1-diphosphonic acid), or in which R is the methyl group or methanephosphoric acid (methylphosphonic acid).

Preferably, the pH during acid hydrolysis is between 0.6 and 1.6, preferably between 0.8 and 1.3, more preferably between 0.9 and 1.

Acid hydrolysis is preferably carried out in a temperature range which extends from 120° C. to 160° C., more preferably from 130° C. to 150° C., still more preferably at 140° C.

Said second solid residue (15) is subsequently subjected to extraction with a nonpolar organic solvent, preferably selected from linear, branched and cyclic alkanes having from 5 to 12 carbon atoms, denoted C5-C12 alkanes, preferably having from 6 to 8 carbon atoms, denoted C6-C8 alkanes, more preferably 5, 6, 7 and 8 carbon atoms, more preferred alkanes are those selected from n-pentane, n-hexane, n-heptane, n-octane and cyclohexane and mixtures thereof, to form an organic solution (305) and a first solid woody residue containing hemicellulose, cellulose and lignin (306). The organic solution is extracted with polar organic solvent (307) preferably selected from acetone, alcohols, ethyl acetates and mixtures thereof to separate, by precipitation, the rubber (310) from the resins which remain in solution (312), while the solid fraction is subjected to methods preferably selected from enzymatic hydrolysis or chemical or thermochemical hydrolysis (311) to obtain a solid woody residue containing at least 80% lignin (308) and C6 sugars from cellulose (309).

The whole guayule plant is cut at the neck of the stem and is mechanically defoliated (1) in such a manner as to separate stem and branches (3) from the leaves (2).

The combined leaves constitute 30-50% of the dry weight of the whole plant. The leaves are separated from the plant upstream of the latex extraction step because their rubber content ranges from just 0.5% to 1.7% by weight, relative to the total weight of the plant, and represents less than 20% of the total rubber. Consequently, the rubber extraction treatment is focused solely on the woody part of the branches and stem which contain over 80% of the rubber.

Reference is made for the following description to FIGS. 1 and 4.

The leaves (2) may be treated (100) to obtain waxes and essential oils (102), preferably with a method selected from solvent extraction, or by steam extraction, or by way of extraction with supercritical $CO_2$.

Once the waxes and essential oils have been separated from the leaves, a solid fraction (101) remains which contains cellulose, hemicellulose, and to a minor extent lignin, salts and organic compounds.

In a preferred embodiment, the solid fraction (101) is treated by saccharification (400). The saccharification process (400) has already been described in the present text and leads to the formation, in two successive stages, of sugars having 5 carbon atoms (C5) (8) and 6 carbon atoms (C6) (16). The first stage preferably proceeds by acid hydrolysis (404) with an organic acid selected from phosphonic acids of the general formula R—$PO(OH)_2$ (I) or from alkylsulfonic acids of the general formula $R^1$—$SO_3H$ (II).

According to the present invention, R is selected from a linear or branched alkyl group, an aromatic group, or a group containing a heteroatom.

According to the present invention, $R^1$ is selected from a linear or branched alkyl group having from 1 to 6 carbon atoms, preferably from 1 to 3 carbon atoms.

The alkyl group R may preferably contain from 1 to 6 carbon atoms, more preferably from 1 to 3 carbon atoms.

When R is an alkyl group, said group is preferably selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

When R is an aromatic group, said group is preferably selected from compounds of the formula: R'—$C_6H_5$ or R'—$C_{10}H_8$ where R' is a linear or branched alkyl having from 1 to 3 carbon atoms, preferably R' is a methyl.

When R is a group containing a heteroatom, said group is preferably selected from those containing oxygen (O), preferably the —OH group or a carbonyl group; or containing nitrogen (N), preferably the —$NH_2$ group or the N-substituted —$NH_2$ group; or containing phosphorus (P), preferably the —$CH_2$—$PO(OH)_2$ (diphosphonate) group.

The alkyl group $R^1$ is preferably selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

More preferred are the alkylphosphonic acids of the general formula R—$PO(OH)_2$ (I), in which R is a linear or branched alkyl group which may contain from 1 to 6 carbon atoms, preferably from 1 to 3 carbon atoms; more preferably R is selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

More preferred are the phosphonic acids of the general formula R—$PO(OH)_2$ (I), in which R is a group containing a heteroatom selected from those containing oxygen (O), preferably the —OH group or a carbonyl group; or containing nitrogen (N), preferably the —$NH_2$ group or the N-substituted —$NH_2$ group; or containing phosphorus (P), preferably the $CH_3$—$PO(OH)_2$ (diphosphonate) group.

Among the phosphonic acids, those which are preferred are those of the general formula R—$PO(OH)_2$ (I), in which R is the —$CH_3OH$—$PO(OH)_2$ (diphosphonate) group or etidronic acid (known as 1-hydroxyethane-1,1-diphosphonic acid), or in which R is the methyl group or methanephosphoric acid (methylphosphonic acid).

Of the alkylsulfonic acids, methanesulfonic acid ($CH_3$—$SO_3H$) is preferred.

Preferably, the pH during acid hydrolysis is between 0.6 and 1.6, preferably between 0.8 and 1.3, more preferably between 0.9 and 1.

Acid hydrolysis is preferably carried out in a temperature range which extends from 120° C. to 160° C., more preferably from 130° C. to 150° C., still more preferably at 140° C.

Following the acid hydrolysis, C5 sugars (8) and the second solid residue (15, 20) are produced.

The second stage provides hydrolysis, preferably selected from enzymatic hydrolysis or chemical or thermochemical hydrolysis (402) to form C6 sugars (16) and a solid residue (17 or 18) which contains either lignin alone or lignin together with rubber and resin.

Both the C5 sugars and the C6 sugars may be used to produce chemicals, microbial oils and biofuels (12) by fermentation (403).

The leaves contain up to 7-8% by weight of resinous substances rich in essential oils which represent over 75% of all the essential oils present in the plant. Apart from the rubber and resin content, the leaves have a composition similar to that of the remainder of the plant, supplemented by small quantities (approx. 1% of their fresh weight) of essential oils, primarily containing terpenes (sesquiterpenes), and waxes. Essential oils and waxes are high added value products which are primarily used to produce pharmaceutical products and compounds for fragrances and perfumery (103). The essential oils may be used in the food sector (flavours or supplements) or in the field of cosmetics and the production of fragrances (which is the largest market in quantitative terms).

Another use of essential oils is the production of special adhesives (tackifiers). In this case the components of the oils are polymerised with themselves to yield a natural adhesive, or are reacted with other components, such as phenol or styrene, by copolymerisation to yield synthetic adhesives.

A preferred method for obtaining waxes and essential oils is steam-distilling the harvested leaves while still fresh. In the case of heat-sensitive oils, solvent extraction is preferably used either with natural fats or with supercritical $CO_2$. Although the content of essential oil in guayule leaves is approx. 1% relative to fresh weight, this quantity is in line with or even greater than the values found in many plants, the essential oils of which are extracted and used for producing commercial preparations.

Both the essential oils and the resins present in the leaves have properties which are often harmful or irritant when they are used in the preparation of animal feedstuffs, as is clear from the following articles:

Hernandez I. T. Tech. Pecuaria Mexico, 1976, 31.89 and
Banigan, T. F., Verbiscar, A. J., Weber, C. W., 1982. (Composition of guayule leaves, seed, and wood. J. Agric. Food Chem. 30, 427-481).

These articles describe that guayule leaves are acceptable as a component in animal feedstuffs only if the resin is removed. For this reason, the resin must be extracted before formulating feedstuffs.

It is known that the resins may be extracted both using organic solvents (for example cyclohexane) and by more selective techniques, such as preferably steam extraction or extraction with supercritical $CO_2$.

The guayule leaves may also be used effectively as amendments for agricultural soils, since they have a microbicidal or bacterial growth regulating action, as is clear from the following articles:

Bultman, J. D., Gilbertson, R. K., Adaskaveg, J., Amburgey, T. L., Parikh, S. V., Bailey, C. A., 1991, (The efficacy of guayule resin as a pesticide. Bioresour. Technol. 35, 1997-2001) and
Nakayama, F. S., Vinyard, S. H., Chow, P., Bajwa, D. S., Youngquist, J. A., Muehl, J. H., Krzysik, A. M., 2001 (Guayule as a wood preservative) Ind. Crops Prod. 14, 105-111.

These articles describe that some terpene components of the resin have an effective antifungal action.

The article by Maatooq G. T. and Hoffmann J. J. (Fungistatic sesquiterpenoids from *Parthenium*, Phytochemistry, 1996, 43, 67-69), on the other hand, states that it is the sesquiterpene components which are responsible for the fungicidal activity.

Among the alternative sources for natural rubber, guayule is of particular interest due to its low content of proteins, the potentially allergenic substances which, in contrast, are present in a distinctly larger quantity in the natural rubber extracted from the tree *Hevea brasiliensis*. For this reason, *Hevea* rubber has high allergenic reactivity when it is used to produce products which are used in contact with the skin.

Although extraction of the latex from the lignocellulosic component is the fundamental purpose of cultivating and producing guayule biomass, if a high level of efficiency and an acceptable economic return are to be achieved from the entire production chain, it is also necessary to use and then utilise the polysaccharide fraction comprising hemicellulose, cellulose and inulin as well as the other components of the plant, such as resins, essential oils, waxes and lignin.

A preferred process for utilising the guayule latex and rubber is shown in FIG. 4 (process for obtaining the latex) and in FIG. 5 (process for obtaining the rubber).

With reference to FIG. 4, after comminution in a mill, the stem and branches (3) are subjected to extraction with a basic aqueous solution (200-A), so separating an aqueous emulsion (201), which is stabilised by appropriate detergents, from a first solid woody residue or bagasse (5) by physical methods, preferably by pressing. The bagasse (5) obtained contains lignin, cellulose, hemicellulose, residual rubber and resin and may be treated by saccharification in two stages (400) in which acid hydrolysis is carried out with a phosphonic acid, an organic acid of the general formula: R—PO(OH)$_2$ (I), in which R is a linear or branched alkyl group, or an aromatic group, or a group containing a heteroatom. The alkyl group may preferably contain from 1 to 6 carbon atoms, more preferably from 1 to 3 carbon atoms.

The alkyl group is preferably selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

The aromatic group is preferably selected from compounds of the formula: R'—C$_6$H$_5$ or R'—C$_{10}$H$_8$ where R' is a linear or branched alkyl having from 1 to 3 carbon atoms, preferably R' is a methyl.

The group containing a heteroatom is preferably selected from those containing oxygen (O), preferably the —OH group or a carbonyl group; or containing nitrogen (N), preferably the —NH$_2$ group or the N-substituted —NH$_2$ group; or containing phosphorus (P), preferably the —CH$_3$OH—PO(OH)$_2$ (diphosphonate) group.

More preferred are the alkylphosphonic acids of the general formula R—P—O(OH)$_2$ (I), in which R is a linear or branched alkyl group which may contain from 1 to 6 carbon atoms, preferably from 1 to 3 carbon atoms; more preferably R is selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

More preferred are the phosphonic acids of the general formula R—PO(OH)$_2$ (I), in which R is a group containing a heteroatom selected from those containing oxygen (O), preferably the —OH group or a carbonyl group; or containing nitrogen (N), preferably the —NH$_2$ group or the N-substituted —NH$_2$ group; or containing phosphorus (P), preferably the CH$_2$—PO(OH)$_2$ (diphosphonate) group.

Among the phosphonic acids, those which are preferred are those of the general formula R—PO(OH)$_2$ (I), in which R is the —CH$_3$OH—PO(OH)$_2$ (diphosphonate) group or etidronic acid (known as 1-hydroxyethane-1,1-diphosphonic acid), or in which R is the methyl group or methanephosphoric acid (methylphosphonic acid).

Preferably, the pH during acid hydrolysis is between 0.6 and 1.6, preferably between 0.8 and 1.3, more preferably between 0.9 and 1.

Acid hydrolysis is preferably carried out in a temperature range which extends from 120° C. to 160° C., more preferably from 130° C. to 150° C., still more preferably at 140° C.

The concentrated latex (203) is obtained from the aqueous emulsion (201) by concentration treatment (200-F), usually by centrifugation, leaving residual water (205). Once concentrated, the latex may already be used as natural rubber.

Natural rubber (204 and 14 in FIG. 1) may also be obtained from said concentrated latex by a subsequent coagulation process which proceeds by adding coagulants such as for example organic acids (citric acid or acetic acid) or inorganic acids (sulphuric acid) (200-B).

Both the concentrated latex and the coagulated natural rubber may be used in the production of articles and products. The coagulated rubber may preferably be used in the tyre manufacturing sector.

The residual water from processing (205) is rich in organic substances and, after optional neutralisation, may optionally be used to produce biogas (206) by anaerobic fermentation, or may be reused in the extraction step with basic water.

With reference to FIG. 5, it is possible to produce natural rubber from the branches and stem without extracting the latex.

The branches and stems, having been comminuted in a mill, are extracted (200-C) with a nonpolar organic solvent preferably selected from hexane, cyclohexane and mixtures thereof, forming a first organic solution (211) and a first solid woody residue (5) which contains lignin, cellulose and hemicellulose, and is virtually free of residual resin and rubber. This first solid residue may subsequently be treated by saccharification in two stages (400) in which acid hydrolysis is carried out with a phosphonic acid, an organic acid of the general formula: R—PO(OH)$_2$ (I), in which R is a linear or branched alkyl group, or an aromatic group, or a group containing a heteroatom.

The alkyl group may preferably contain from 1 to 6 carbon atoms, more preferably from 1 to 3 carbon atoms.

The alkyl group is preferably selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

The aromatic group is preferably selected from compounds of the formula: R'—C$_6$H$_5$ or R'—C$_{10}$H$_8$ where R' is a linear or branched alkyl having from 1 to 3 carbon atoms, preferably R' is a methyl.

The group containing a heteroatom is preferably selected from those containing oxygen (O), preferably the —OH group or a carbonyl group; or containing nitrogen (N), preferably the —NH$_2$ group or the N-substituted —NH$_2$ group; or containing phosphorus (P), preferably the —CH$_3$OH—PO(OH)$_2$ (diphosphonate) group.

More preferred are the alkylphosphonic acids of the general formula R—PO(OH)$_2$ (I), in which R is a linear or branched alkyl group which may contain from 1 to 6 carbon atoms, preferably from 1 to 3 carbon atoms; more preferably R is selected from methyl, ethyl, 1-propyl, 2-propyl, n-butyl, sec-butyl, tert-butyl, isobutyl, pentyl, 1-methylbutyl, 1-ethylpropyl, 2-methylbutyl, 1,2-dimethylpropyl, 3-methylbutyl, 1,1-dimethylpropyl, 2,2-dimethylpropyl, n-hexyl, 2-methylpentyl, 3-methylpentyl, 2,2-dimethylbutyl or 2,3-dimethylbutyl.

More preferred are the phosphonic acids of the general formula R—PO(OH)$_2$ (I), in which R is a group containing a heteroatom selected from those containing oxygen (O), preferably the —OH group or a carbonyl group; or containing nitrogen (N), preferably the —NH$_2$ group or the N-substituted —NH$_2$ group; or containing phosphorus (P), preferably the CH$_2$—PO(OH)$_2$ (diphosphonate) group.

Among the phosphonic acids, those which are preferred are those of the general formula R—PO(OH)$_2$ (I), in which R is the —CH$_3$OH—PO(OH)$_2$ (diphosphonate) group or etidronic acid (known as 1-hydroxyethane-1,1-diphosphonic acid), or in which R is the methyl group or methanephosphoric acid (methylphosphonic acid).

Preferably, the pH during acid hydrolysis is between 0.6 and 1.6, preferably between 0.8 and 1.3, more preferably between 0.9 and 1.

Acid hydrolysis is preferably carried out in a temperature range which extends from 120° C. to 160° C., more preferably from 130° C. to 150° C., still more preferably at 140° C.

The natural rubber (212) is precipitated by adding a polar solvent (200-D) preferably selected from acetone, alcohols preferably including ethanol, esters preferably including ethyl acetate, or a mixture thereof, to the first organic phase (211) and a second organic phase (213) is formed, from which the resins (215) may be recovered, preferably by removing the solvent.

The natural rubber (212) may be resuspended in water in the form of a fine emulsion to reconstitute a latex (213) by appropriate techniques for dispersing and stabilising the emulsions (200-E).

The latex and rubber may then be used for the production of products and articles based on natural rubber.

FIG. 6 describes a preferred process for utilising the resin according to the present patent application.

The first solid woody residue (5) is pretreated by saccharification (400) in two stages according to the method described at various points in the text of the present patent application (not mentioned here for brevity's sake), in order to convert the hemicellulose into C5 sugars (8), forming the second solid residue (15) containing cellulose, resin, residual rubber and lignin.

Said second solid residue is subsequently subjected to extraction with a nonpolar organic solvent (303) preferably selected from hexane, cyclohexane and mixtures thereof (305) and a solid fraction containing cellulose and lignin (306). The organic solution is extracted with polar organic solvent preferably selected from acetone, alcohols, with ethanol being preferred among these, or esters, with ethyl acetate being preferred among the latter, or a mixture thereof (307) to separate the rubber (310) and resin (312). The solid fraction is subjected to methods selected from enzymatic hydrolysis or chemical or thermochemical hydrolysis (311) to obtain C6 sugars from cellulose (309) and a solid woody residue comprising at least 80% lignin (308).

FIG. 7 describes a preferred process for utilising the bagasse to form fermentable sugars.

Guayule bagasse is a biomass which comprises cellulose, hemicellulose, lignin, residual rubber and resin. Said biomass is a complex structure comprising three main polymeric components, cellulose, hemicellulose and lignin, which interact strongly with one another. The interaction between these polymers must be disrupted such that, once the less resistant polymer, namely hemicellulose, has been hydrolysed, the more crystalline and stable cellulose too may readily be attacked with specific enzymes to achieve complete hydrolysis.

For the purpose of optimising conversion of the bagasse hemicellulose and cellulose into sugars usable to produce products for energy use or chemicals, it is known to subject said bagasse to a preliminary treatment, pre-treatment or destructuring. Said pre-treatment makes it possible to weaken the bonds between lignin and cellulose, making the latter more susceptible to subsequent hydrolysis, for example by enzymes, and simultaneously makes it possible to hydrolyse the hemicellulose, which is more readily degradable than cellulose, to simple sugars having 5 carbon atoms.

The simple C5 sugars may subsequently be subjected to fermentation processes (403). Various kinds of bagasse pre-treatment may be used, preferably selected from chemical pre-treatment with acids or bases; physicochemical pre-treatment selected from treatment at high pressure and temperature, comminution, microwaves or ultrasound; or biological pre-treatment, such as for example degradation with selected microorganisms.

A process conventionally used for the above-stated purpose is acid hydrolysis, which may be carried out in the presence of dilute or concentrated acids. However, the pre-treatment methods with acids described in the prior art may exhibit some drawbacks. For example, performing acid hydrolysis at excessively high temperatures may result in the formation of reaction by-products derived from the dehydration of the sugars and partial depolymerisation of the lignin such as, for example furfural (F), hydroxymethylfurfural (HMF) or phenolic compounds, which act as growth inhibitors on the microorganisms conventionally used in the subsequent sugar fermentation processes, bringing about a substantial reduction in the efficiency and productivity of said processes.

If, on the contrary, acid hydrolysis is carried out at excessively low temperatures, an inadequate destructuring of the bagasse may be obtained, such destructuring being necessary for the cellulose fibres to be released from the hemicellulose-lignin network covering them so that they may be used advantageously in the subsequent enzymatic hydrolysis stage. This is because the cellulose fibres interwoven with hemicellulose-lignin are not readily accessible to the enzymes (for example, cellulase) conventionally used in enzymatic hydrolysis. Furthermore, the acids normally used for this purpose in literature, such as sulphuric or hydrochloric acid, do not always give rise to the desired results, in particular in terms of high overall yields of monomeric sugars and formation of low levels of unwanted by-products (F and HMF or others which inhibit fermentation).

In order to overcome the critical drawbacks of the prior art, the Applicant accordingly decided to subject the bagasse (5) to saccharification in two stages, as comprehensively described and claimed in the present patent application (404 and 402).

In particular, the first stage is an acid hydrolysis (404), as comprehensively described and claimed in the present patent application, which converts the hemicellulose into C5 sugars and forms a second solid woody residue containing cellulose, lignin, resins and rubber. Said solid residue is subsequently subjected to further hydrolysis (402) which may be selected from enzymatic hydrolysis or chemical or thermochemical hydrolysis to yield C6 sugars (16) and a solid residue (17, 18) which predominantly contains lignin, or lignin, residual rubber and resin, and cellulose in a quantity of no more than 20%.

Said solid residue may subsequently be utilised for extraction of the residual resin and rubber, as described in the present patent application, or to obtain lignin, as has already been comprehensively described and claimed in the present patent application. The C5 sugars and C6 sugars may conveniently be used for fermentation by microorganisms (403) capable of producing chemicals, microbial oils or biofuels (12).

It has thus been observed that extraction of the resin is quantitative not only after having pre-treated the bagasse with dilute acids but also after subsequent hydrolysis with enzymes.

The Applicant has thus specified an integrated process for the production of biomass sugars capable of yielding:
  elevated conversion of the hemicellulose component (>95%) and, consequently,
  a high yield of sugars having from 5 to 6 carbon atoms, in particular sugars having 5 carbon atoms such as xylose or arabinose (i.e. a yield of sugars having from 5 to 6 carbon atoms of greater than or equal to 95%, said yield being calculated relative to the total quantity of hemicellulose present in the starting biomass), and
  a small quantity of by-products [e.g., furfural (F), hydroxymethylfurfural (HMF)], i.e. less than or equal to 3% (relative to total sugars).

Some illustrative, non-limiting examples of the present invention are provided below to assist in understanding the present invention and the implementation thereof.

Example 1—Extraction and Yield of Essential Oils 100 g of guayule leaves (50% $H_2O$) were introduced into a steam extractor.

Distillation was carried out for 4 hours with 1000 $cm^3$ of $H_2O$ being collected. 1.1 g of an oil was separated at the surface of the aqueous phase, analysed by GC-MS, the main components being identified as: borneol, eudesmol and spathulenol. The borneol was thus obtained by hydrolysis of bornyl acetate, one of the main terpene components of the fraction.

Comparative Example 1—Extraction of Resin from Unprocessed Bagasse 100 g of bagasse (50% $H_2O$) and 500 $cm^3$ of acetone were introduced into a 1 l flask. The mixture was stirred at 45° C. for 2 hours, filtered and washing was performed with acetone. The acetonic solution was concentrated. 2.9 g of viscous residue were obtained, corresponding to 5.8% wt./wt. relative to dry biomass. The bagasse residue was subjected to another extraction with acetone under identical conditions (500 ml of acetone, stirring for 2 hours at 45° C.). After washing with fresh solvent and filtration of the solid residue, the acetonic solution was concentrated by removal of the solvent under reduced pressure. 0.8 g of resin were obtained. The quantity of resin extracted with 2 passes corresponded to 7.4% wt./wt. relative to the dry starting bagasse.

Example 3—Resin Extraction from Bagasse Treated with Dilute Acids 100 g of wet bagasse originating from treatment with dilute acids (301) (example 5) were introduced into a 1 l flask. As observed, the component composed of hemicellulose (approx. 18% wt./wt.) was completely hydrolysed. The residue still contained the residual resins and rubber (not extracted as latex). The sample, composed of 50% $H_2O$, was suspended in 500 $cm^3$ of acetone. The mixture was stirred for 2 hours at 45° C., filtered and washing was performed with fresh solvent. The acetonic solution was concentrated.

3.1 g were obtained, corresponding to 6.2% relative to the dry bagasse without hemicellulose. Said quantity relative to the unprocessed bagasse before hydrolysis with acids corresponds to the total quantity of resin present in the bagasse (7.5%).

Example 4—Extraction of Active Ingredients from Bagasse Treated with Dilute Acids The resin extracted in Example 3 was analysed by GC. It was observed that part of the ester group of the guayulines (50-80% depending on the conditions of treatment with dilute acids) was hydrolysed to yield the alcoholic terpene component, partheniol, and cinnamic acid (for guayuline A) and methoxybenzoic acid (for guayuline B) (Scheme 1).

Scheme 1

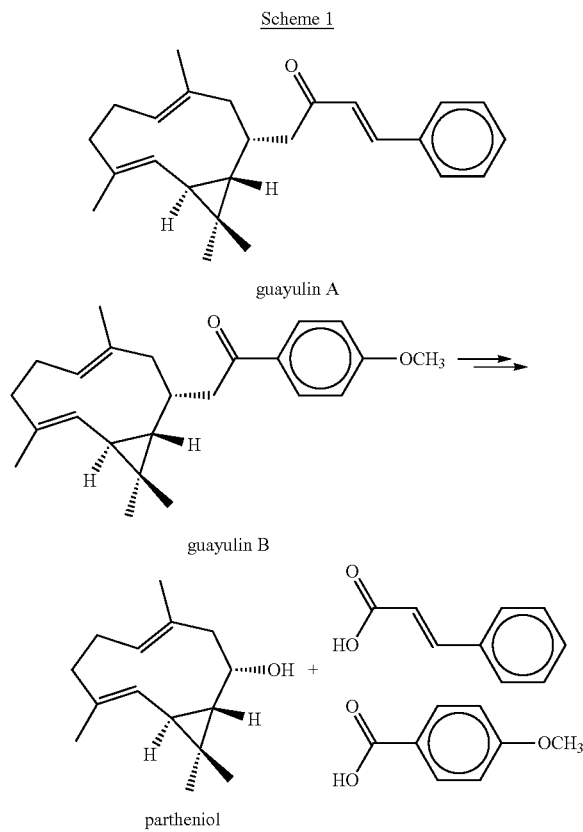

The partheniol could then be readily extracted and purified using known methods (for example by extraction with cold alcohol).

Example 5—Hydrolysis with Methanephosphonic Acid 25 g of previously ground guayule bagasse (particle diameter <2 mm) were introduced into a Büchi model 3E/1.0 l autoclave open to the atmosphere.

500 g of an aqueous solution of methanephosphonic acid $CH_3-P(O)(OH)_2$ at pH 1.1 were then introduced. The first reaction mixture obtained in this manner was vigorously stirred (600 revolutions/min) over a period of 45 minutes until a temperature of 140° C. was reached, a second reaction mixture comprising a first solid phase containing lignin and cellulose and a first aqueous phase containing the sugars derived from hemicellulose being obtained. Once the autoclave had been allowed to cool to room temperature (23° C.), said phases were separated by filtration. The composition of the starting biomass, determined as described above, was as follows: 40.3% by weight cellulose, 18.7% by weight hemicellulose and 30.4% by weight lignin, relative to the total weight of the starting biomass. The remainder was found to be composed of organic acids, protein and non-protein nitrogenous substances, lipids and mineral salts.

The first phase aqueous was analysed as described above, the following results being obtained:
    yield: 99.1% (relative to the total quantity of hemicellulose present in the starting biomass);
    C6 degradation rate: 0.0%;
    C5 degradation rate: 0.9%
    C5 content: 83.1%.

Example 6—Hydrolysis with Etidronic Acid 25 g of previously ground guayule bagasse (particle diameter <2 mm) were introduced into a Büchi model 3E/1.0 l autoclave open to the atmosphere.

500 g of an aqueous solution of etidronic acid, i.e. 1-hydroxyethane-1,1-diphosphoric acid $CH_3-CH(OH)[P(O)(OH)_2]$, at pH 1.1 were then introduced. The first reaction mixture obtained in this manner was vigorously stirred (600 revolutions/min) over a period of 45 minutes until a temperature of 140° C. was reached, a second reaction mixture comprising a first solid phase containing lignin and cellulose and a first aqueous phase containing the sugars derived from hemicellulose being obtained. Once the autoclave had been allowed to cool to room temperature (23° C.), said phases were separated by filtration. The composition of the starting biomass, determined as described above, was as follows: 40.3% by weight cellulose, 18.7% by weight hemicellulose and 30.4% by weight lignin, relative to the total weight of the starting biomass. The remainder was found to be composed of organic acids, protein and non-protein nitrogenous substances, lipids and mineral salts.

The first phase aqueous was analysed as described above, the following results being obtained:
    yield: 98.2% (relative to the total quantity of hemicellulose present in the starting biomass);
    C6 degradation rate: 0.0%;
    C5 degradation rate: 1.1%;
    C5 content: 84.3%.

Comparative Example 2—Hydrolysis with Phosphoric Acid 25 g of previously ground guayule (*Parthenium argentatum*) bagasse (particle diameter <2 mm) were introduced into a Büchi model 3E/1.0 l autoclave open to the atmosphere. 500 g of an aqueous solution of phosphoric acid $H_3POH_4$ at pH 1.1 were then introduced. The first reaction mixture obtained in this manner was vigorously stirred (600 revolutions/min) over a period of 45 minutes until a temperature of 140° C. was reached, a second reaction mixture comprising a first solid phase containing lignin and cellulose and a first aqueous phase containing the sugars derived from hemicellulose being obtained. Once the autoclave had been allowed to cool to room temperature (23° C.), said phases were separated by filtration.

The composition of the starting biomass, determined as described above, was as follows: 40.3% by weight cellulose, 18.7% by weight hemicellulose and 30.4% by weight lignin, relative to the total weight of the starting biomass. The remainder was found to be composed of organic acids, protein and non-protein nitrogenous substances, lipids and mineral salts.

The first phase aqueous was analysed as described above, the following results being obtained:
  yield: 87% (relative to the total quantity of hemicellulose present in the starting biomass);
  C6 degradation rate: 3.3%;
  C5 degradation rate: 9.7%;
  C5 content: 71.1%.

It is clear from Examples 5 and 6 and Comparative Example 2 that, working under identical conditions, the yields of sugars having from 5 to 6 carbon atoms proved lower and the quantities of by-products [i.e. furfural (F) and hydroxymethylfurfural (HMF)] proved higher when using phosphoric acid (Comparative Example 2), in comparison with Examples 5 and 6 in which alkylphosphonic acids were used in accordance with the present invention.

Example 7—Leaves, Hydrolysis with Methanesulfonic Acid 25 g of the leaf fraction 101 obtained after extraction of the essential oils and waxes with a moisture content of 50%, were introduced into a Büchi model 3E/1.0 l autoclave open to the atmosphere. 500 g of an aqueous solution of methanesulfonic acid ($CH_3$—$SO_3H$) at pH 1.1 were then introduced. The first reaction mixture obtained in this manner was vigorously stirred (600 revolutions/min) over a period of 45 minutes until a temperature of 140° C. was reached, a second reaction mixture comprising a first solid phase containing lignin and cellulose and a first aqueous phase containing the sugars derived from hemicellulose being obtained.

Once the autoclave had been allowed to cool to room temperature (23° C.), said phases were separated by filtration.

The composition of the starting biomass, determined as described above, was as follows: 30% by weight cellulose, 30% by weight hemicellulose and 4% by weight lignin, relative to the total weight of the starting biomass. The remainder was found to be composed of organic acids, protein and non-protein nitrogenous substances, lipids and mineral salts.

The first phase aqueous was analysed as described above, the following results being obtained:
  yield: 98.8% (relative to the total quantity of hemicellulose present in the starting biomass);
  C6 degradation rate: 0.0%;
  C5 degradation rate: 1.6%;
  C5 content: 60%.

Example 8—Leaves, Hydrolysis with Methanephosphonic Acid 10 g of the leaf fraction 101 obtained after extraction of the essential oils and waxes with a moisture content of 50%, were introduced into a Büchi model 3E/1.0 l autoclave open to the atmosphere. 500 g of an aqueous solution of methanephosphonic acid at pH 1.1 were then introduced. The first reaction mixture obtained in this manner was vigorously stirred (600 revolutions/min) over a period of 45 minutes until a temperature of 140° C. was reached, a second reaction mixture comprising a first solid phase containing lignin and cellulose and a first aqueous phase containing the sugars derived from hemicellulose being obtained.

Once the autoclave had been allowed to cool to room temperature (23° C.), said phases were separated by filtration.

The composition of the starting biomass, determined as described above, was as follows: 30% by weight cellulose, 30% by weight hemicellulose and 4% by weight lignin, relative to the total weight of the starting biomass. The remainder was found to be composed of organic acids, protein and non-protein nitrogenous substances, lipids and mineral salts. The first phase aqueous was analysed as described above, the following results being obtained:
  yield: 97% (relative to the total quantity of hemicellulose present in the starting biomass);
  C6 degradation rate: 0.0%;
  C5 degradation rate: 1.4%;
  C5 content: 65%.

TABLE 1

Guayule bagasse. Yields for hydrolysis of hemicellulose (hydrolysis with dilute acids), cellulose (hydrolysis with enzymes) and total conversion to fermentable sugars relative to available carbohydrates

| | | Hydrolysis, % | | |
|---|---|---|---|---|
| Example | | Hemi-cellulose | Cell-ulose | Total |
| Comp. 3 | unprocessed bagasse, enzymatic hydrolysis | 4 | 10 | 8 |
| 10 | bagasse + hydrolysis with dilute acids + enzymatic hydrolysis | 99 | 75 | 83 |
| Comp. 4 | bagasse + hydrolysis with dilute acids + resin extraction + enzymatic hydrolysis | 99 | 55 | 69 |
| Comp. 5 | bagasse + resin extraction + hydrolysis with dilute acids + enzymatic hydrolysis | 85 | 50 | 61 |

Example 10—Enzymatic Hydrolysis of Acid-Pretreated Residue 10 g of guayule (*Parthenium argentatum*) residue originating from Example 5 (water content: 50%) after hydrolysis of the hemicellulose by methanephosphonic acid were introduced into a closed CSTR reactor together with 450 g of water. A mixture of enzymes (Novozyme, DK) corresponding to a concentration of 20 mg/g of cellulose present in the sample was added. The mixture primarily comprised cellulase, but also hemicellulase and β-glucosidase. The first reaction mixture obtained in this manner was vigorously stirred (300 revolutions/min) at 50° C. for 60 h. After said period, the remaining solid phase was separated from the supernatant by filtration. The composition of the starting biomass, determined as described above, was as follows: 49% by weight cellulose, 1.0% by weight hemicellulose and 36.9% by weight lignin, relative to the total weight of the starting biomass. 1.7 g of glucose, corresponding to a cellulose hydrolysis yield of 75%, were obtained. Taking the hemicellulose conversion obtained in Example 5 into account, total conversion to monomeric sugars relative to total available sugars was 83%.

Comparative Example 3—Enzymatic Hydrolysis of Unprocessed, Non-Acid-Pre-Treated Bagasse 10 g of unprocessed guayule (*Parthenium argentatum*) bagasse after extraction of the latex (water content: 50%)

were introduced into a closed CSTR reactor together with 450 g of water. A mixture of enzymes (Novozyme, DK) corresponding to a concentration of 30 mg/g of cellulose present in the sample was added. The mixture primarily comprised cellulase, but also hemicellulase and β-glucosidase. The first reaction mixture obtained in this manner was vigorously stirred (300 revolutions/min) at 50° C. for 60 h. After said period, the remaining solid phase was separated from the supernatant by filtration. The composition of the starting biomass, determined as described above, was 40% by weight cellulose, 18.7% hemicellulose and 30.4% lignin. The remainder was found to be composed of organic acids, protein and non-protein nitrogenous substances, lipids and mineral salts. 0.02 g of xylose, corresponding to a hemicellulose hydrolysis yield of 4%, and 0.19 g of glucose, corresponding to a cellulose hydrolysis yield of 10%, were obtained. The total carbohydrate hydrolysis yield was thus 8% relative to the total available monomeric sugars.

Example 10 and Comparative Example 3 show that the biomass must be pre-treated with acids in order to achieve good levels of conversion into fermentable sugars.

Example 11—Resin Extraction from Bagasse Treated with Dilute Acids and with Enzymes 100 g of wet bagasse originating from treatment with dilute acids (404) and with enzymes (402) (example 10) were introduced into a 1 l flask. As observed, the component of hemicellulose (approximately 18% wt./wt.) was completely hydrolysed while the cellulose was 75% hydrolysed. The remaining lignocellulosic residue still contained the residual resins and rubber (not extracted as latex). The sample, composed of 50% $H_2O$, was suspended in 500 cm³ of acetone. The mixture was stirred for 2 hours at 45° C., filtered and washing was performed with fresh solvent. The acetonic solution was concentrated. 5.9 g were obtained, corresponding to 11.8% relative to dry residue without hemicellulose and (partially) without cellulose. Said quantity relative to the unprocessed bagasse before hydrolysis with acids corresponds to the total quantity of resin present in the initial bagasse (7.5%).

Comparative Example 4—Enzymatic Hydrolysis of Acid-Pre-Treated and Deresinated Residue 10 g of guayule residue originating from Example 3 (water content: 50%) after hydrolysis of the hemicellulose by methanephosphonic acid and after extraction of the resin (302) were introduced into a closed CSTR reactor together with 450 g of water. A mixture of enzymes (Novozyme, DK) corresponding to a concentration of 20 mg/g of cellulose present in the sample was added. The mixture primarily comprised cellulase, but also hemicellulase and β-glucosidase. The first reaction mixture obtained in this manner was vigorously stirred (300 revolutions/min) at 50° C. for 60 h. After said period, the remaining solid phase was separated from the supernatant by filtration. The composition of the starting biomass was as follows: 53% by weight cellulose, 0.2% by weight hemicellulose and 40% by weight lignin, relative to the total weight of the starting biomass. 1.3 g of glucose, corresponding to a cellulose hydrolysis yield of 55%, were obtained. Taking the hemicellulose conversion obtained in the example 5 into account, total conversion to monomeric sugars relative to total available sugars was 69%.

Comparative Example 5—Enzymatic Hydrolysis of Deresinated and Acid-Pre-Treated Residue 10 g of guayule residue originating from Comparative Example 6 (water content: 50%) after extraction of the resin and subsequent hydrolysis of the hemicellulose by methanephosphonic acid were introduced into a closed CSTR reactor together with 450 g of water. A mixture of enzymes (Novozyme, DK) corresponding to a concentration of 30 mg/g of cellulose present in the sample was added. The mixture primarily comprised cellulase, but also hemicellulase and β-glucosidase. The first reaction mixture obtained in this manner was vigorously stirred (300 revolutions/min) at 50° C. for 60 h. After said period, the remaining solid phase was separated from the supernatant by filtration. The composition of the starting biomass was as follows: 51% by weight cellulose, 3% by weight hemicellulose and 38% by weight lignin, relative to the total weight of the starting biomass. 1.2 g of glucose, corresponding to a cellulose hydrolysis yield of 50%, were obtained. Taking into account the hemicellulose conversion obtained (85%), total conversion to monomeric sugars relative to total available sugars was 61%.

Comparative Examples 4 and 5 show that when the order 'carbohydrate hydrolysis/resin extraction' is modified, carbohydrate conversion levels are distinctly lower, as shown in Table 1. The modification of the sequence involves carrying out the resin extraction step before the final enzymatic hydrolysis of the cellulose, both before and after hydrolysis of the hemicellulose with dilute acids. It should be noted on the other hand that when it is desired to give priority to resin recovery by carrying out resin extraction before final hydrolysis with enzymes, recovering the resin requires half the quantity of solvent if acid treatment has already been carried out (Example 3).

Comparative Example 6—Hydrolysis with Methanesulfonic Acid of Deresinated Residue 25 g of guayule bagasse residue treated in Comparative Example 1 (after resin extraction) were introduced into Büchi model 3E/1.0 l autoclave open to the atmosphere. 500 g of an aqueous solution of methanephosphonic acid $CH_3$—$P(O)(OH)_2$ at pH 1.1 were then introduced. The first reaction mixture obtained in this manner was vigorously stirred (600 revolutions/min) over a period of 45 minutes until a temperature of 140° C. was reached, a second reaction mixture comprising a first solid phase containing lignin and cellulose and a first aqueous phase containing the sugars derived from hemicellulose being obtained. Once the autoclave had been allowed to cool to room temperature (23° C.), said phases were separated by filtration. The composition of the biomass was as follows: 43% by weight cellulose, 20% by weight hemicellulose and 32% by weight lignin. The remainder was found to be composed of organic acids, protein and non-protein nitrogenous substances, lipids and mineral salts.

The first phase aqueous was analysed as described above, the following results being obtained:
  yield: 85% (relative to the total quantity of hemicellulose present in the starting biomass);
  C6 degradation rate: 0.0%;
  C5 degradation rate: 01.1%;
  C5 content: 75.1%.

Comparative Example 6 is the preparation of the residue used in the enzymatic hydrolysis of Comparative Example 5. Together with Example 5, it defines the preparation of the deresinated and non-deresinated residues used in Comparative Example 4 and Comparative Example 5.

Example 12—Leaves. Enzymatic Hydrolysis of Residue Pre-Treated with Methanesulfonic Acid 10 g of solid residue of guayule leaves originating from Example 8 (water content: 50%) after hydrolysis of the hemicellulose by methanesulfonic acid were introduced into a closed CSTR reactor together with 450 g of water. A mixture of enzymes (Novozyme, DK) corresponding to a concentration of 40 mg/g of cellulose present in the sample was added. The mixture primarily comprised cellulase, but also hemicellulase and β-glucosidase. The first reaction mixture obtained in this manner was vigorously stirred (300 revolutions/min) at 50° C. for 60 h. After said period, the remaining solid phase was separated from the supernatant by filtration. The composition of the starting biomass, determined as described above, was as follows: 43% by weight cellulose, 1.0% by weight hemicellulose and 5.6% by weight lignin, relative to the total weight of the starting biomass. 1.4 g of glucose, corresponding to a cellulose hydrolysis yield of 72%, were obtained. Taking the hemicellulose conversion obtained in Example 8 into account, total conversion to monomeric sugars relative to total available sugars was 85%.

Example 13—Leaves. Enzymatic Hydrolysis of Residue Pretreated with Methanephosphonic Acid 10 g of solid residue of guayule leaves originating from Example 9 (water content: 50%) after hydrolysis of the hemicellulose by methanephosphonic acid were introduced into a closed CSTR reactor together with 450 g of water. A mixture of enzymes (Novozyme, DK) corresponding to a concentration of 40 mg/g of cellulose present in the sample was added. The mixture primarily comprised cellulase, but also hemicellulase and β-glucosidase. The first reaction mixture obtained in this manner was vigorously stirred (300 revolutions/min) at 50° C. for 60 h. After said period, the remaining solid phase was separated from the supernatant by filtration. The composition of the starting biomass, determined as described above, was as follows: 43% by weight cellulose, 1.0% by weight hemicellulose and 5.6% by weight lignin, relative to the total weight of the starting biomass. 1.5 g of glucose, corresponding to a cellulose hydrolysis yield of 74%, were obtained. Taking the hemicellulose conversion obtained in Example 9 into account, total conversion to monomeric sugars relative to total available sugars was 86%.

The invention claimed is:

1. A process for processing and utilising every part of a guayule plant (*Parthenium argentatum*) comprising the following steps in sequence:
    separating the stem and branches from the leaves of said guayule plant with a mechanical treatment;
    treating the leaves to produce waxes and essential oils, and to form a solid fraction containing cellulose, hemicellulose, salts, lignin and other organic compounds;
    extracting from the stem and branches a liquid phase and thereby forming a first solid woody residue;
    treating said first solid woody residue to form sugars, resin, rubber and lignin.

2. The process according to claim 1, wherein the stem and branches are treated by extraction conducted with basic water to form an aqueous emulsion comprising the first solid woody residue.

3. The process according to claim 2, further comprising extracting a concentrated latex from said aqueous emulsion and coagulating and separating a natural rubber from the concentrated latex.

4. The process according to claim 1, wherein the stem and branches are treated by extraction with a nonpolar organic solvent to form an organic solution and the first solid woody residue.

5. The process according to claim 4, further including extracting a natural rubber from said organic solution, and dispersing the natural rubber subsequently in water to form latex.

6. The process according to claim 1, wherein the first solid woody residue is treated according to the following steps in sequence:
    extracting resin and rubber from said first solid woody residue and forming a fifth solid woody residue containing lignin, hemicellulose and cellulose;
    hydrolysing said fifth solid woody residue to form sugars having 5 carbon atoms and a sixth solid woody residue containing lignin and cellulose;
    hydrolysing said sixth solid residue to convert the cellulose into sugars having 6 carbon atoms, and forming a final solid residue containing lignin and an amount of residual cellulose of less than 20%.

7. The process according to claim 6, wherein the first solid woody residue is treated by extraction with a nonpolar organic solvent.

8. The process according to claim 6, wherein hydrolysing the fifth solid woody residue is conducted by acid hydrolysis.

9. The process according to claim 8, wherein hydrolysing is carried out with a phosphonic acid of general formula $RPO(OH)_2$ (I), in which R is a linear or branched alkyl group, or an aromatic group, or a group containing a heteroatom.

10. The process according to claim 9, in which R is an alkyl group containing from 1 to 6 carbon atoms, or R is selected from the compounds of formula $R'—C_6H_5$ or $R'—C_{10}H_8$ where R' is a linear or branched alkyl group having from 1 to 3 carbon atoms, or R is a group containing a heteroatom selected from those containing oxygen (O) or containing nitrogen (N) or containing phosphorus (P).

11. The process according to claim 9, wherein R is methyl, ethyl, or $CH_3OH—PO(OH)_2$.

12. The process according to claim 8 wherein the pH during acid hydrolysis is between 0.6 and 1.6.

13. The process according to claim 6, wherein hydrolysing the sixth solid residue is conducted by enzymatic hydrolysis, chemical hydrolysis, or thermochemical hydrolysis.

14. The process according to claim 1, in which the first solid residue is treated according to the following steps in sequence:
    treating the first solid woody residue to form sugars having 5 carbon atoms and a second solid residue,
    treating said second solid residue to form sugars having 6 carbon atoms and a third solid residue,
    extracting resin and rubber from said third solid residue to form a fourth woody residue mainly comprising lignin.

15. The process according to claim 14, further comprising treating the third solid woody residue by solvent extraction with an organic nonpolar solvent to separate the resin and rubber and to form a fifth solid woody residue comprising lignin, hemicellulose and cellulose.

16. The process according to claim 14, wherein treating the first solid woody residue is conducted by acid hydrolysis to convert the hemicellulose into sugars having 5 carbon atoms and thereby forming the second solid woody residue comprising lignin and cellulose.

17. The process according to claim 16, wherein acid hydrolysis is carried out with a phosphonic acid of general formula R—PO(OH)$_2$ (I), in which R is a linear or branched alkyl group, or an aromatic group, or a group containing a heteroatom.

18. The process according to claim 17, in which R is an alkyl group containing from 1 to 6 carbon atoms, or R is selected from the compounds of formula R'—C$_6$H$_5$ or R'—C$_{10}$H$_8$ where R' is a linear or branched alkyl group having from 1 to 3 carbon atoms, or R is a group containing a heteroatom selected from oxygen (O), nitrogen (N) or phosphorus (P).

19. The process according to claim 18, in which R is methyl, ethyl or CH$_3$OH—PO(OH)$_2$.

20. The process according to claim 16, wherein the pH during acid hydrolysis is between 0.6 and 1.6.

21. The process according to claim 16, wherein said second woody residue is treated by enzymatic hydrolysis, chemical hydrolysis, or thermochemical hydrolysis.

22. The process according to claim 1, further comprising:
subjecting the solid fraction containing cellulose, hemicellulose, lignin, salts and other organic compounds to acid hydrolysis to convert the hemicellulose into monomeric sugars having 5 carbon atoms, and to form an intermediate product containing cellulose,
subjecting said intermediate product to further hydrolysis to convert the cellulose into sugars having 6 carbon atoms.

23. The process according to claim 22, wherein acid hydrolysis is carried out with an organic acid selected from the phosphonic acids of general formula R—PO(OH)$_2$ (I) or from alkylsulfonic acids of general formula R$^1$—SO$_3$H (II), in which R is selected from a linear or branched alkyl group, an aromatic group, or a group containing a heteroatom, and R$^1$ is selected from a linear or branched alkyl group having 1 to 6 carbon atoms.

24. The process according to claim 23, wherein R is an alkyl group containing from 1 to 6 carbon atoms, or R is selected from the compounds of formula R'—C$_6$H$_5$ or R'—C$_{10}$H$_8$ where R' is a linear or branched alkyl group having from 1 to 3 carbon atoms, or R is a group containing a heteroatom selected from oxygen (O), nitrogen (N) or phosphorus (P).

25. The process according to claim 24, wherein R is selected from methyl, ethyl or CH$_3$OH—PO(OH)$_2$.

26. The process according to claim 23, wherein R$^1$ is methyl.

27. The process according to claim 22, further comprising producing with the C5 sugars and C6 sugars chemicals, microbial oils or biofuels by fermentation.

28. The process according to claim 27, wherein the produced chemicals are butandiols or bio-butadiene.

29. The process according to claim 22, wherein the pH during acid hydrolysis is between 0.6 and 1.6.

30. The process according to claim 22, further comprising separating the waxes and essential oils by a method selected from solvent extraction or steam extraction or extraction with supercritical CO$_2$.

31. The process according to claim 22, wherein the further hydrolysis of the intermediate product is conducted by a method selected from enzymatic hydrolysis, chemical hydrolysis, or thermochemical hydrolysis.

* * * * *